US012634898B2

(12) United States Patent
Wang et al.

(10) Patent No.: US 12,634,898 B2
(45) Date of Patent: May 19, 2026

(54) POSTPONING OF APERIODIC SOUNDING REFERENCE SIGNALS

(71) Applicant: QUALCOMM Incorporated, San Diego, CA (US)

(72) Inventors: Runxin Wang, San Diego, CA (US); Muhammad Sayed Khairy Abdelghaffar, San Jose, CA (US); Alexandros Manolakos, Escondido, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 18/042,578

(22) PCT Filed: Oct. 28, 2020

(86) PCT No.: PCT/CN2020/124281
§ 371 (c)(1),
(2) Date: Feb. 22, 2023

(87) PCT Pub. No.: WO2022/087874
PCT Pub. Date: May 5, 2022

(65) Prior Publication Data
US 2023/0328698 A1 Oct. 12, 2023

(51) Int. Cl.
*H04W 72/0446* (2023.01)
*H04L 5/00* (2006.01)
*H04W 72/232* (2023.01)

(52) U.S. Cl.
CPC ....... *H04W 72/0446* (2013.01); *H04L 5/0051* (2013.01); *H04W 72/232* (2023.01)

(58) Field of Classification Search
CPC ............ H04W 72/0446; H04W 72/232; H04L 5/0051
See application file for complete search history.

(56) References Cited

U.S. PATENT DOCUMENTS

| | | | |
|---|---|---|---|
| 11,101,904 | B2 | 8/2021 | Hao et al. |
| 2019/0254061 | A1 | 8/2019 | Manolakos et al. |

(Continued)

FOREIGN PATENT DOCUMENTS

| | | |
|---|---|---|
| CN | 110603751 A | 12/2019 |
| CN | 111757434 A | 10/2020 |

(Continued)

OTHER PUBLICATIONS

Intel, R1-2005863, 'Discussion on SRS enhancements', 3GPP TSG RAN WG1 Meeting #102-3, Aug. 17-28, 2020, pp. 1-13 ( Year: 2020).*

(Continued)

*Primary Examiner* — Melvin C Marcelo
(74) *Attorney, Agent, or Firm* — QUALCOMM Incorporated

(57) ABSTRACT

Aspects relate to wireless communication for slot postponing of aperiodic sound reference signals (A-SRS) by a user equipment in a wireless network. A network node, such as a gNodeB, may send at least a portion of a slot postponing configuration for transmission of aperiodic sounding reference signals (A-SRSs) to a user equipment (UE). In a particular aspect, the slot postponing configuration is established through RRC signaling and does not utilize downlink control information (DCI) or MAC-CE sent parameters for establishing the slot postponing configuration. The slot positioning configuration is used to control slot offset postponing, the number of slot offsets, the number of times transmission of A-SRS can be postponed in the UE, and priority rules based on the postponing configuration.

30 Claims, 16 Drawing Sheets

(56) References Cited

U.S. PATENT DOCUMENTS

| | | | |
|---|---|---|---|
| 2020/0259610 A1 | 8/2020 | Malek-Mohammadi et al. | |
| 2022/0330300 A1* | 10/2022 | Wang | H04W 72/1273 |
| 2023/0079945 A1* | 3/2023 | Manolakos | H04L 5/006 |
| | | | 370/329 |
| 2023/0361964 A1* | 11/2023 | Gao | H04L 5/0048 |
| 2023/0379111 A1* | 11/2023 | Abdelghaffar | H04L 5/0087 |

FOREIGN PATENT DOCUMENTS

| | | |
|---|---|---|
| WO | 2018083630 A1 | 5/2018 |
| WO | 2019213914 A1 | 11/2019 |
| WO | 2020114505 A1 | 6/2020 |

OTHER PUBLICATIONS

Qualcomm Incorporated: "Enhancements on SRS Flexibility, Switching, Coverage and Capacity", 3GPP TSG- RAN WG1 Meeting #102-e, R1-2006795, e-Meeting, Aug. 17-28, 2020, Aug. 8, 2020, 26 Pages, Section 2.

Huawei, et al., "Discussion on Spatial Relation Switch for Uplink," 3GPP TSG-RAN WG4 Meeting #94-e, R4-2001667, Online, Feb. 24-Mar. 6, 2020, (Jun. 3, 2020), 5 pages, sections 2-3.

International Search Report and Written Opinion—PCT/CN2020/124281—ISA/EPO—Jul. 26, 2021.

VIVO: "Discussion on SRS Enhancement", 3GPP TSG RAN WG1 #102-e, R1-2005368, e-Meeting, Aug. 17, 2020-Aug. 28, 2020, 17 pages, Aug. 28, 2020 (Aug. 28, 2020), section 5.2, sections 1-5, the whole document.

Qualcomm Incorporated: "Discussion on SRS Enhancement", 3GPP TSG-RAN WG1 Meeting #103-e, R1-2009255, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov 13, 2020, Oct. 24, 2020, 32 Pages, XP051946918, p. 4.

Supplementary European Search Report—EP20959038—Search Authority—The Hague—Jun. 26, 2024.

VIVO: "Discussion on SRS Enhancement", 3GPP TSG RAN WG1 #103-e, R1-2007649, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020, 21 Pages, XP051946458, p. 2-p. 4.

* cited by examiner

```
SRS-ResourceSet ::=          SEQUENCE {
  srs-ResourceSetId          SRS-ResourceSetId,
  srs-ResourceIdList         SEQUENCE (SIZE(1..maxNrofSRS-ResourcesPerSet)) OF SRS-ResourceId          OPTIONAL,
  resourceType               CHOICE {
    aperiodic                SEQUENCE {
      aperiodicSRS-ResourceTrigger     INTEGER (1..maxNrofSRS-TriggerStates-1),
      csi-RS                           NZP-CSI-RS-ResourceId                          OPTIONAL,
      slotOffset                       INTEGER (1..32)                                OPTIONAL,
      ...
      [[
      aperiodicSRS-ResourceTriggerList    SEQUENCE (SIZE(1..maxNrofSRS-TriggerStates-2))
                                          OF INTEGER (1..maxNrofSRS-TriggerStates-1)   OPTIONAL
      ]]
    },
    semi-persistent          SEQUENCE {
      associatedCSI-RS                 NZP-CSI-RS-ResourceId                          OPTIONAL,
      ...
    },
    periodic                 SEQUENCE {
      associatedCSI-RS                 NZP-CSI-RS-ResourceId                          OPTIONAL,
      ...
    }
  },
  usage                      ENUMERATED {beamManagement, codebook, nonCodebook, antennaSwitching},
  alpha                      Alpha                                                    OPTIONAL,
  p0                         INTEGER (-202..24)                                       OPTIONAL,
  pathlossReferenceRS        PathlossReferenceRS-Config                               OPTIONAL,
  srs-PowerControlAdjustmentStates   ENUMERATED { sameAsFci2, separateClosedLoop}     OPTIONAL,
  ...
  [[
  pathlossReferenceRSList-r16    SetupRelease { PathlossReferenceRSList-r16}          OPTIONAL
  ]]
}
```

FIG. 6

| Same carrier, same symbol(s) | PUCCH carrying only CSI report(s) or only L1-RSRP report(s) | | PUCCH carrying HARQ-ACK and/or SR | A-SRS | SP-SRS | P-SRS |
|---|---|---|---|---|---|---|
| | | PUCCH carrying semi-persistent/periodic (SP/P) CSI report(s) or SP/P L1-RSRP report(s) only | | | | |
| A-SRS | No rules (error case) | A-SRS | PUCCH | No rules (error case) | A-SRS | A-SRS |

| A carrier not configured for PUSCH/PUSSC transmission overlap result in UL transmission beyond UE's indicated UL carrier aggregation capability included in TS 38.306 | PUSCH/PUCCH transmission carrying HARQ-ACK(positive SR/RI/CRI and/or PRACH happen | PUCCH transmission carrying aperiodic CSI | PUCCH/PUSCH transmission carrying periodic CS comprising only CQI/PMI and/or SRS transmission on another serving cell configured for PUSCH/ PUCCH transmission | PUSCH transmission carrying aperiodic CSI comprising only CQI/PMI |
|---|---|---|---|---|
| A-SRS | PUSCH/PUCCH and/or PRACH | No rules (Error case) | A-SRS | A-SRS |

Start

Send at least a portion of a slot postponing configuration for transmission of aperiodic sounding reference signals (A-SRSs) to a user equipment (UE)    ~1602

Send a trigger for A-SRS transmission to the UE    ~1604

Receive an A-SRS from the UE configured according to the slot postponing configuration    ~1606

End

POSTPONING OF APERIODIC SOUNDING REFERENCE SIGNALS

CROSS-REFERENCE TO RELATED APPLICATION(S)

This application is the U.S. national stage of PCT patent application number PCT/CN2020/124281 filed on Oct. 28, 2020.

TECHNICAL FIELD

The technology discussed below relates generally to wireless communication and, more particularly, to postponing of aperiodic sounding reference signals (A-SRS).

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a cell via a network node, which may be implemented by a base station or gNodeB (gNB), for example.

In 5G RANs, a sounding reference signal (SRS) is a reference signal that is transmitted by a UE in the uplink (UL) direction to a gNB or base station (or other network node). The SRS may provide information about the combined effect of multipath fading, scattering, Doppler and power loss of transmitted signal, for example. This information, in turn, may be used by the base station or gNB to estimate the channel quality of the UL channel over a wide range of frequencies (e.g., the full bandwidth) and allocate transmission resources to bandwidth regions (e.g., bandwidth parts) having better channel quality, or for positioning. One particular type of SRS is aperiodic SRS (A-SRS), which is a "trigger type" of SRS transmission that may be configured by radio resource control (RRC) layers and is triggered by downlink control information (DCI) transmitted on the downlink (DL) from the gNB to the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to a first example, methods, apparatus, and/or computer readable medium causing a processor to execute instructions are disclosed for implementing an user equipment (UE). The methods, apparatus, and/or computer readable medium, implement receiving, from a network node, at least a portion of a slot postponing configuration for transmission of aperiodic sounding reference signals (A-SRSs). Additionally, the methods, apparatus, and/or computer readable medium, implement transmitting an A-SRS according to the slot postponing configuration.

According to another example, methods, apparatus, and/or computer readable medium causing a processor to execute instructions are disclosed for implementing an network node, such as a gNB or base station. The methods, apparatus, and/or computer readable medium, implement sending of at least a portion of a slot postponing configuration for transmission of aperiodic sounding reference signals (A-SRSs) to a user equipment (UE). Additionally, the methods, apparatus, and/or computer readable medium, implement sending a trigger for A-SRS transmission to the UE and receiving an A-SRS from the UE that is configured according to the slot postponing configuration.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 6 illustrates an RRC information element (IE) with slot offset configuration according to some aspects.

FIG. 7 illustrates tables of A-SRS priority rules or constraints according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
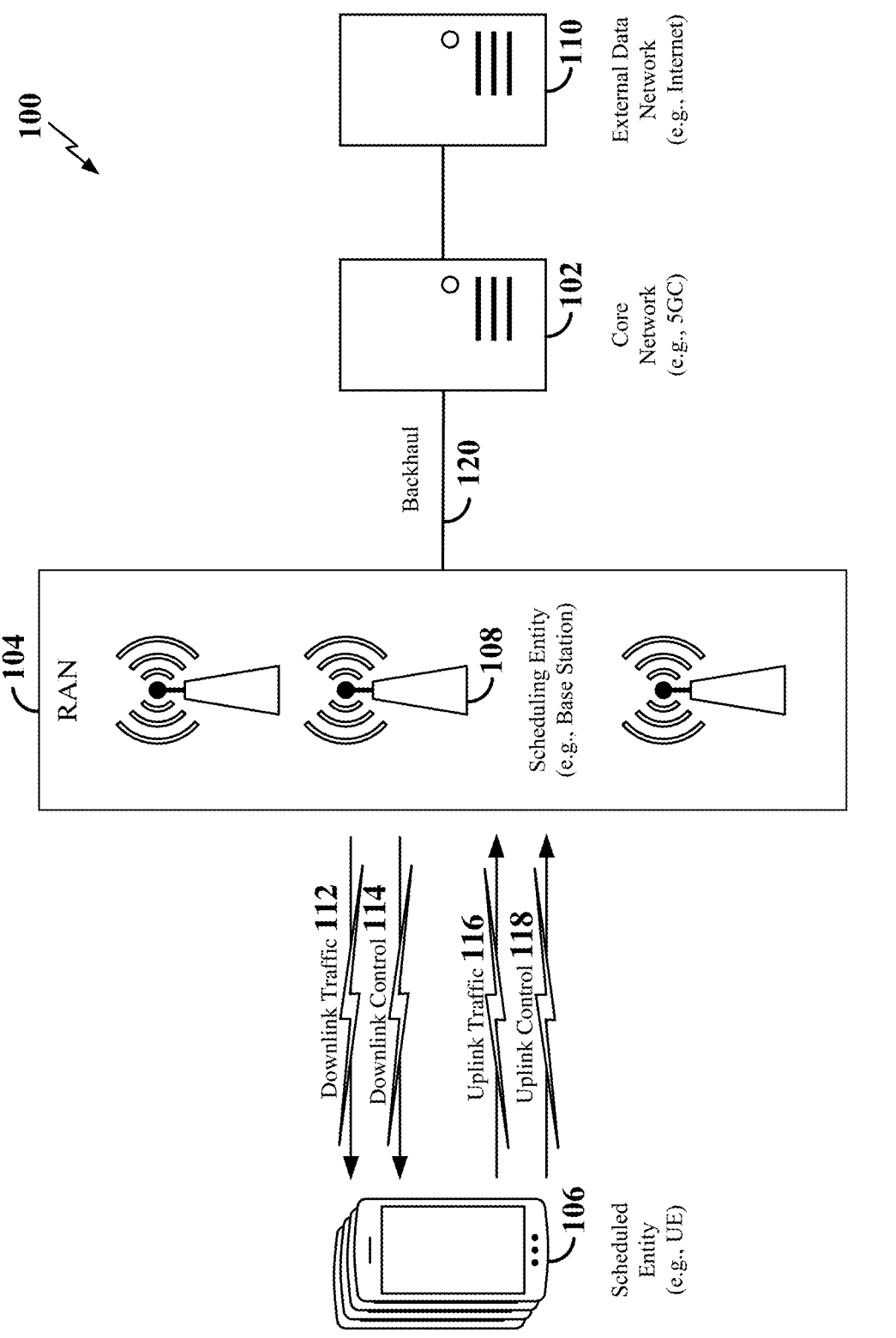
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below, e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below, e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
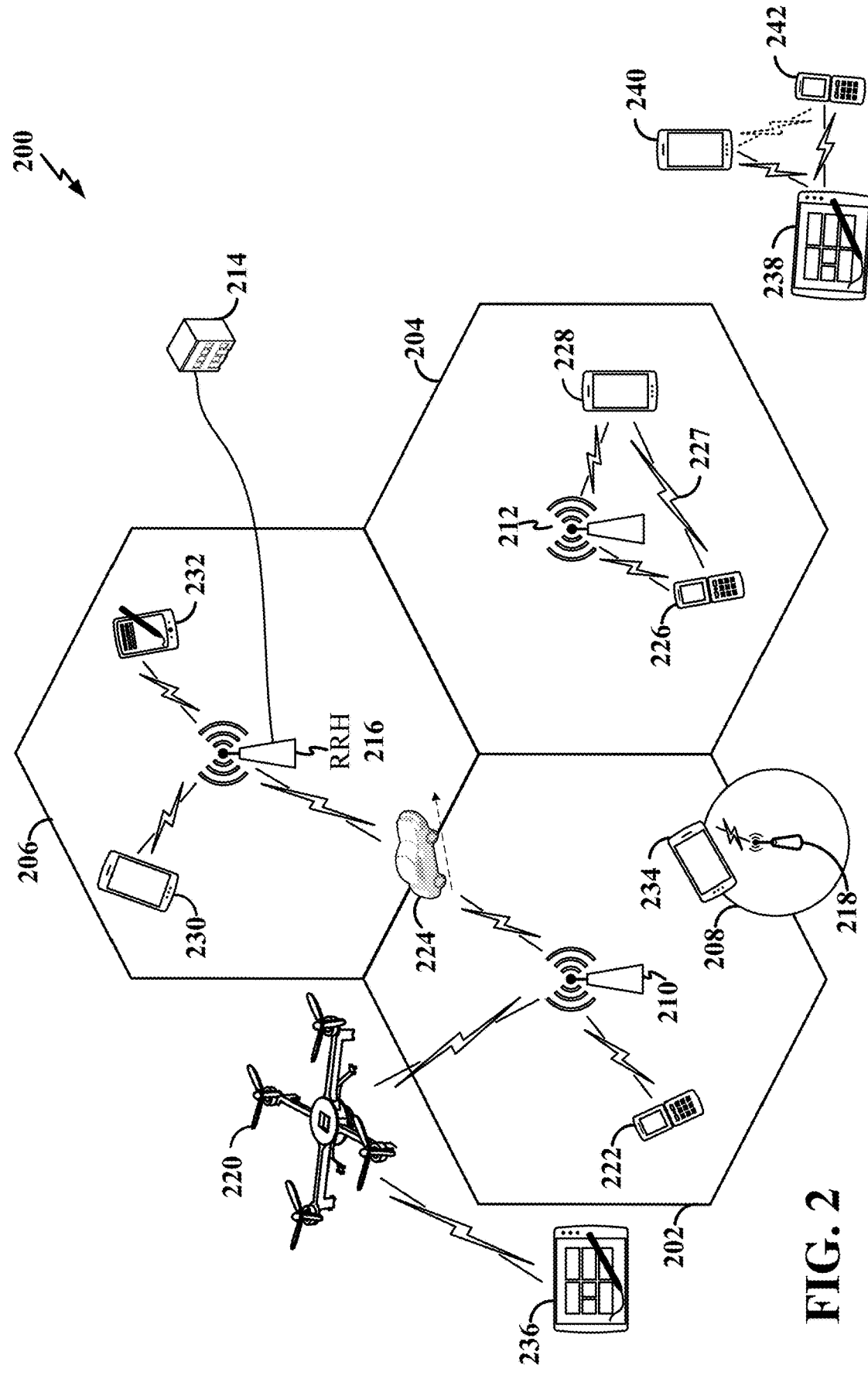
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time—frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
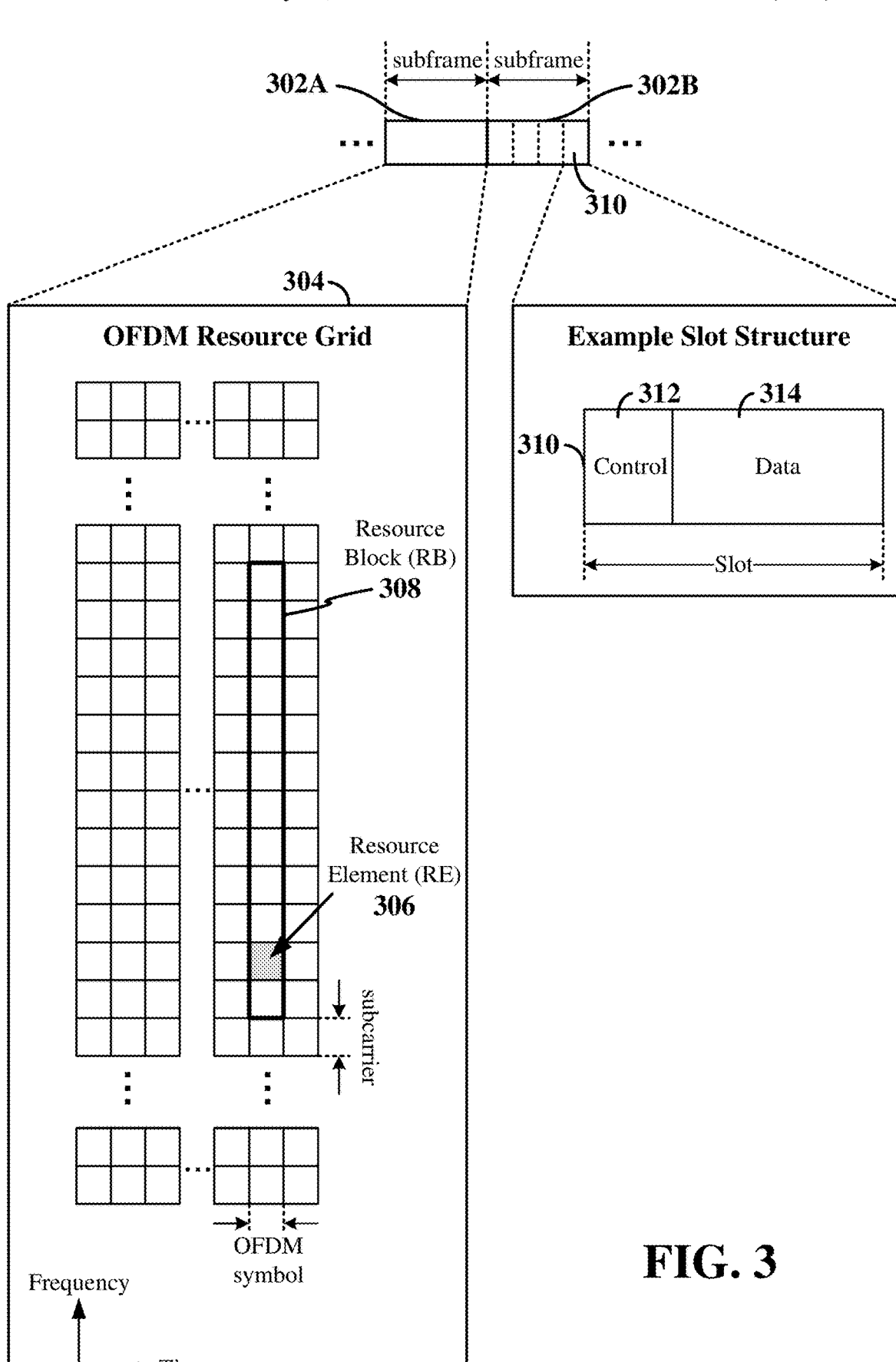
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols, and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH, and/or a physical downlink control channel (PDCCH), etc., to one or more scheduled entities. The transmitting device may further allocate one or more REs 306 to carry other DL signals, such as a DMRS, a phase-tracking reference signal (PT-RS), a channel state information-reference signal (CSI-RS), a primary synchronization signal (PSS), and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals, may include one or more supplemental channels in addition to the PBCH, may omit a PBCH, and/or may utilize a different number of symbols and/or nonconsecutive symbols for an SSB, within the scope of the present disclosure.

The SSB may be used to send system information (SI) and/or provide a reference to SI transmitted via another channel. Examples of system information may include, but are not limited to, subcarrier spacing, system frame number, a cell global identifier (CGI), a cell bar indication, a list of common control resource sets (coresets), a list of common search spaces, a search space for system information block 1 (SIB1), a paging search space, a random access search space, and uplink configuration information. Two specific examples of coresets include PDCCH CORESET 0 and CORESET 1.

The PDCCH may carry downlink control information (DCI) including but not limited to power control commands, scheduling information, a grant, and/or an assignment of REs for DL and UL transmissions. The PHY carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., a request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH, or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

5G-NR networks may further support carrier aggregation (CA) of component carriers transmitted from different cells and/or different transmission and reception points (TRPs) in a multi-cell transmission environment. The different TRPs may be associated with a single serving cell or multiple serving cells. In some aspects, the term component carrier may refer to a carrier frequency (or band) utilized for communication within a cell.

Additionally, 5G-NR utilize sounding reference signals (SRS), which are transmitted from a UE to the network on the UL, such as from a UE to a base station or gNB, for example. Further, triggered SRS or aperiodic SRS (A-SRS) may be used where the transmission of the A-SRS resources is triggered by downlink control information (DCI) transmitted on the DL from a network node such as a base station or gNB, for example. In particular, a physical downlink control channel (PDCCH) may convey the DCI from the network nodes. Additionally, there is a slot offset of a predetermined number of slots between the receipt of the DCI at the UE to the triggered transmission of the A-SRS resources by the UE. This slot offset may be configured by radio resource control (RRC) signaling from the network to UEs operable in the network.

Figure 4A:
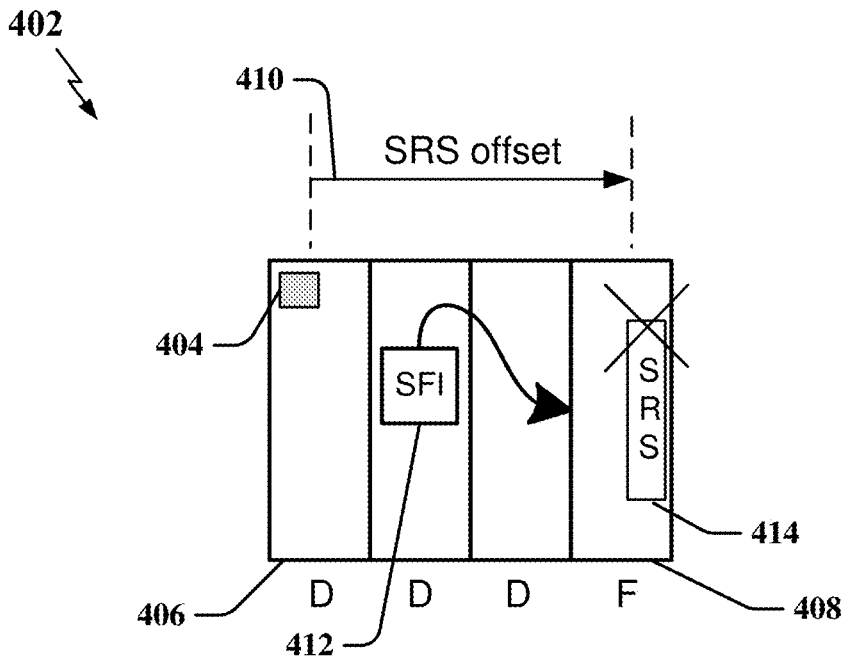
FIGS. 4A and 4B show examples of PDCCH triggering for A-SRS transmissions according to some aspects.

In some scenarios, the A-SRS cannot be transmitted at the scheduled slot (i.e., a slot that is offset by the slot offset number of slots) due to resources not being available for SRS transmission (e.g., an UL slot "U" is converted or reassigned to a DL slot for a flexible ("F") slot or there is a collision with a higher priority signal or channel. As an illustration, FIG. 4A shows a number of slots 402 where a DCI 404 in a slot 406 (e.g., slot(n)) is used to trigger a UE to transmit an A-SRS transmission at a slot 408 after some SRS offset 410 (e.g., slot(n+k) where k is the number of offset slots). In the interim period of the SRS offset 406, a slot format indication (SFI) 410 may be received, such as when dynamic TDD is employed. Here, the SFI 410 converts an F slot 412 scheduled for A-SRS transmission on the UL to a DL slot. Accordingly, the UE is unable to transmit an A-SRS 414 transmission.

Figure 4B:
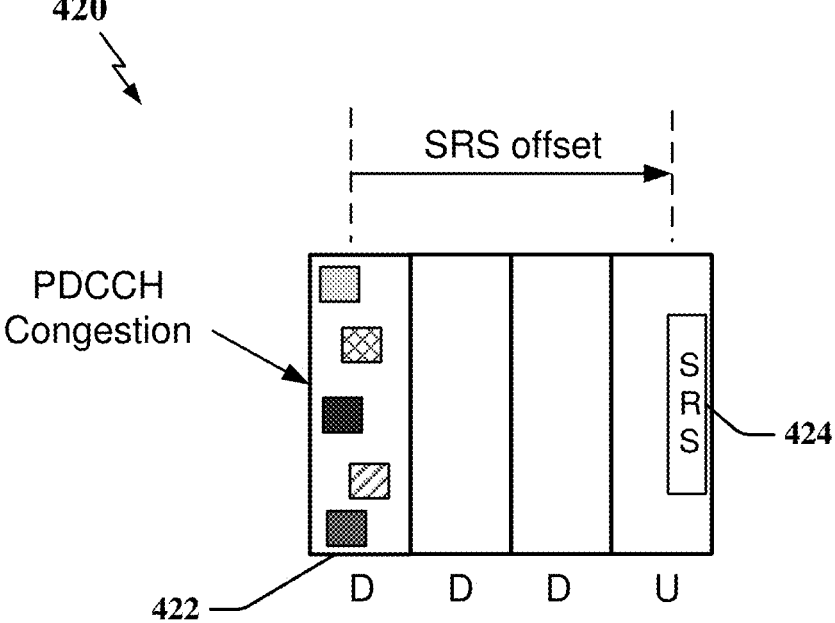

FIG. 4B illustrates another example of a situation where A-SRS may not be able to be transmitted. In particular, FIG. 4B illustrates a number of slots 420 where a UE may not be able to transmit a triggered A-SRS in the situation where the PDCCH is congested as shown in slot 422, such as in the case of multiple SRS triggering. Thus, in this case the network needs to sends multiple PDCCHs at a specific slot and the UE may not be able to transmit a particular SRS 424 after the SRS offset time.

Figure 5:
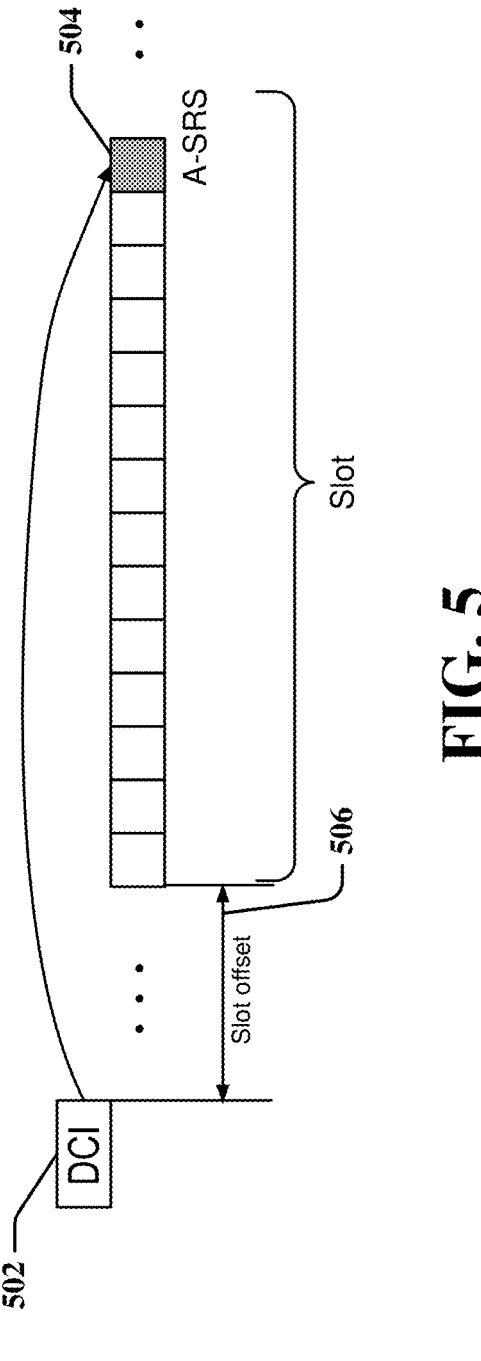
FIG. 5 illustrates an example of DCI triggering of A-SRS transmission with a slot offset according to some aspects.

As mentioned earlier, A-SRS may be triggered based on the DCI, with a slot offset being preconfigured with a radio resource control (RRC) parameter(s). As shown in FIG. 5, DCI 502 received on the PDCCH triggers the A-SRS transmission at a symbol 502 within a slot that is configured in RRC with a slot offset 506, which is an RRC parameter. It is noted that each block illustrated in FIG. 5 represents a symbol, an each of these symbols may be within a slot such as was illustrated by slot 310 in FIG. 3. The slot offset 506 may be measured or determined in terms of the number of slots.

FIG. 6 illustrates an exemplary RRC information element shown that an A-SRS set is configured in RRC with a "slotOffset" shown at 602. This offset may be configured with an integer value denoting the slot offset amount, which may be from 1 to 32 as shown at 604. It is noted that this is merely exemplary and that one skilled in the art will appreciate that other offset values outside this range may be applied in other RAN systems that may be developed. The offset, according to one example, represents a number of slots between the triggering DCI (e.g., 502 in FIG. 5) and the actual transmission of this SRS-ResourceSet (e.g., 504 in FIG. 5). If the field 602 and/or 604 is absent, the UE may be configured to apply no offset (value 0) in one further example. In further aspects, it is noted that resource trigger list may be established wherein a priority or ordering of A-SRS triggering may be configured as shown at 606 (i.e., aperiodicSRS-ResourceTriggerList), for example.

The A-SRS resources may also be prioritized according to predefined priority rules. Such priority rules are useful as the A-SRS transmissions may collide with other signals or channels. In one aspect, the priority rules may be defined when a collision has occurred. FIG. 7 illustrates a table of priority rules for A-SRS transmissions. These rules are merely exemplary and the present disclosure may relate to or be applied with various different priority rule schemes. As may be seen in the table, for various conditions, the A-SRS might be given priority, whereas other conditions warrant other signals having priority in the cases of collision.

Figures 8A, 8B:
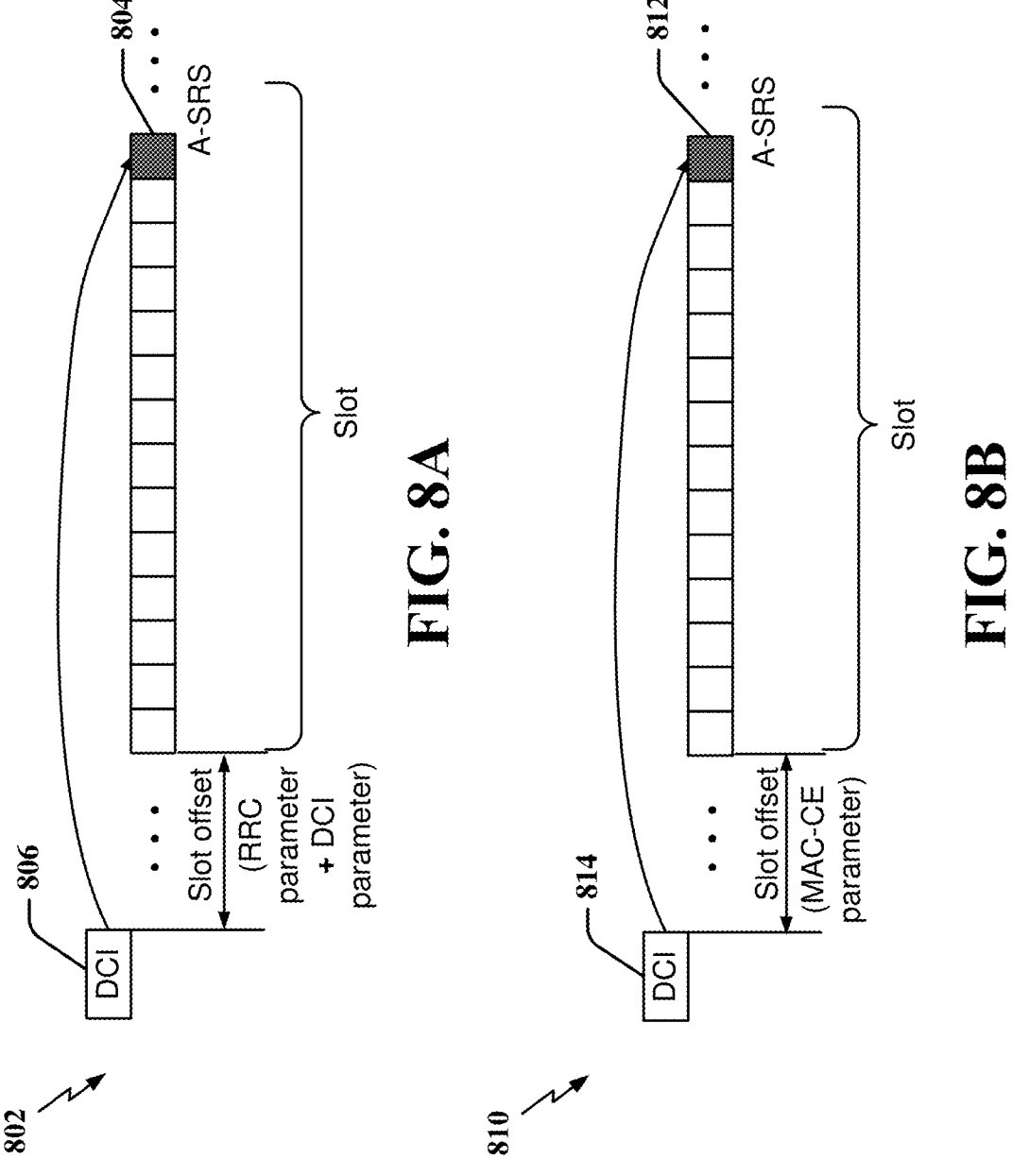
FIGS. 8A and 8B illustrate configurations for DCI triggering based on DCI or MAC-CE information being used, in part, for setting A-SRS slot offsets according to some aspects.

In other examples, it is noted that a DCI may be configured with a parameter by the network node (e.g., gNB), which may be termed a "DCI parameter" that may further communicate and modify the slot offset for A-SRS transmission. FIG. 8A illustrates an example 802 where RRC parameters as well as DCI parameters affect the slot offset and when the A-SRS in a particular symbol 804 within a slot will be scheduled for transmission based on the offset. In this case, the DCI 806 may include parameters that are used by a receiving UE to determine the slot offset. Again, it is noted that slot offset may be measured or determined in terms of the number of slots. Each of the blocks shown in FIG. 8A after the slot offset are symbols, which may be symbols within a particular slot according to a slot structure such as was discussed earlier with respect to FIG. 3.

FIG. 8B illustrates an example 810 where media access control (MAC) control element (MAC-CE) parameters affect the slot offset and when A-SRS 804 will be scheduled for transmission based on the offset. In this case, the DCI 806 or other information in the PDCCH may include the MAC-CE parameters that are used by a receiving UE to determine the slot offset and when to transmit A-SRS 804. Again, it is noted that slot offset may be measured or determined in terms of the number of slots. Each of the blocks shown in FIG. 8B after the slot offset are symbols, which may be symbols within a particular slot according to a slot structure such as was discussed earlier with respect to FIG. 3.

In the case where the A-SRS resources may not be transmitted in the scheduled slot based on the offset, such as was discussed with regard to the examples of FIGS. 4A and 4B, schemes for postponing the A-SRS have been proposed to address such cases in order to ensure transmission of the A-SRS. In some aspects, the DCI parameters such as in the example of FIG. 8A may include further parameters to configure an extra slot offset that may be utilized by a UE when postponing an A-SRS transmission. In other examples, a MAC-CE/DCI may overwrite RRC parameters for slot offset at the UE.

Figure 9:
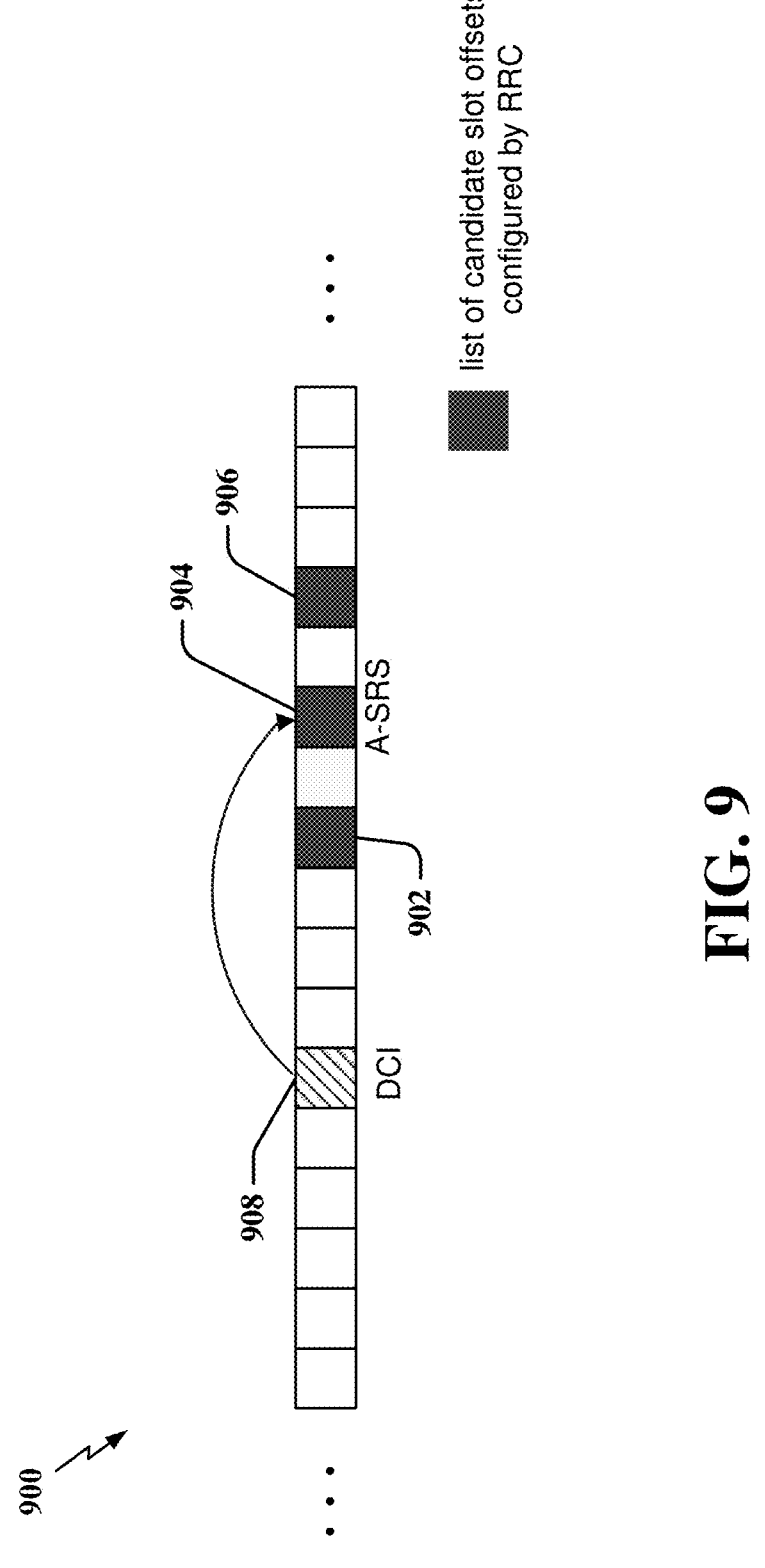
FIG. 9 illustrates an example of a transmission timeline of a number of slots with a list of candidate slot offsets according to some aspects.

In still other examples, multiple slots may be configured for the A-SRS resource set. As one example of this configuration, FIG. 9 illustrates a transmission timeline 900 of a number of slots, wherein a list of candidate slot offsets may be configured by RRC. These multiple slot offset locations are shown at shaded slots 902, 904, and 906, but the disclosure is not limited to three slot offset locations, and this is merely for the sake of illustration. When the triggering DCI shown at 908 is transmitted, this DCI 908 may include an indication to the UE of the selection of one slot offset to trigger. In this example, DCI 908 triggers the slot offset at 904 for transmission of A-SRS.

Figure 10:
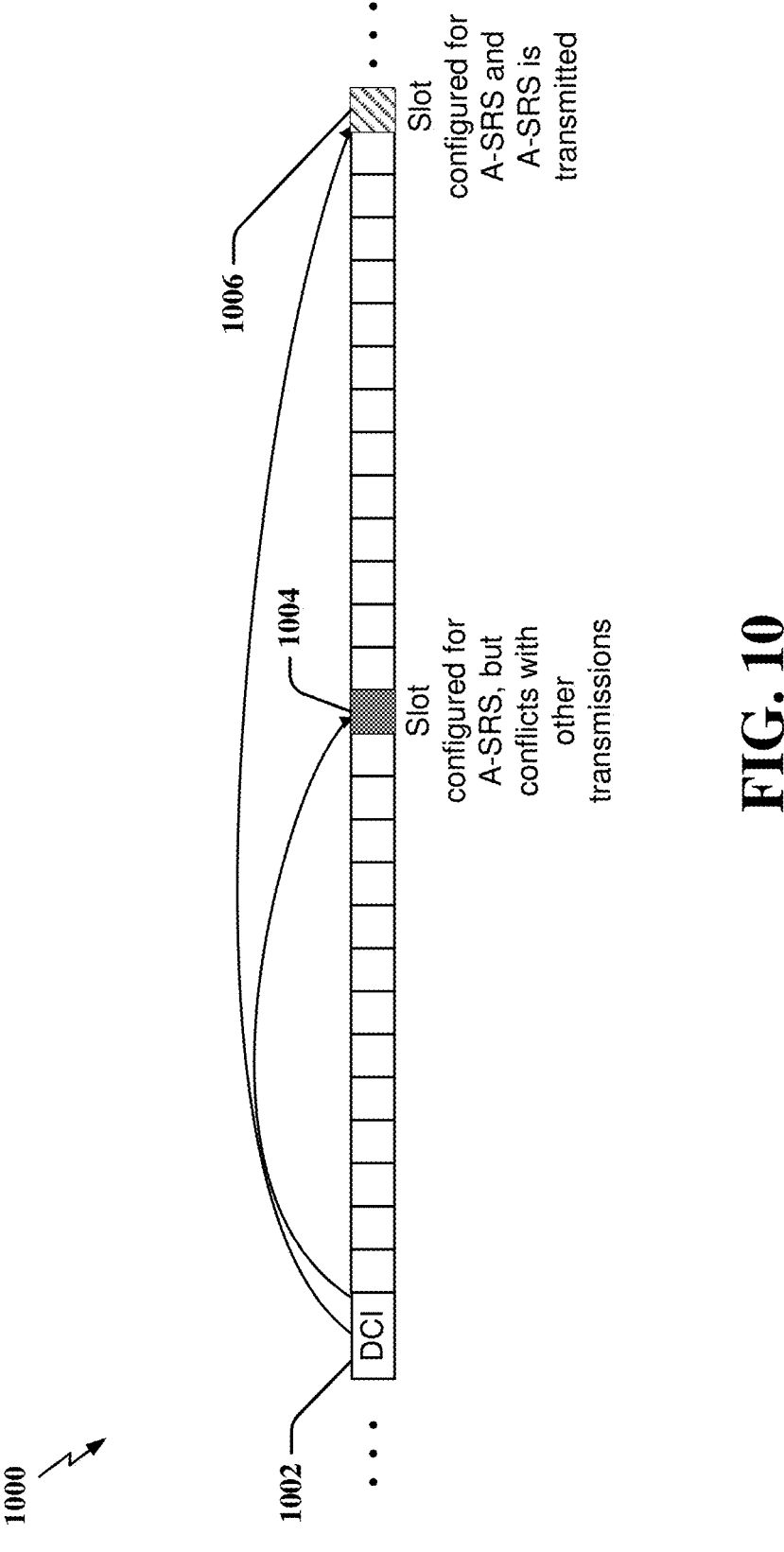
FIG. 10 illustrates another example of a transmission timeline of a number of slots with a list of candidate slot offsets according to some aspects.

In another example, DCI may be configured to trigger all possible slots in a configured list or set of slot offsets that could be used for A-SRS. An illustration of this example is shown in FIG. 10. In particular, FIG. 10 illustrates a transmission timeline 1000 of a number of slots, where again a list of candidate slot offsets may be configured by RRC. In this example, a triggering DCI 1002 may be configured to trigger each possible slot offset location in a list of slot offsets, which correspond to the slots at 1004 and 1006 in this example, but is not limited to such for other configurations. Here, if the slot offset corresponding to slot 1004 has a conflicting transmission, the A-SRS is not transmitted. At slot 1006, the A-SRS is then transmitted, where the transmission is postponed rather than altogether eliminated due to the conflict.

The proposals for A-SRS postponement discussed in the examples of FIGS. 9 and 10 rely on DCI signaling or MAC-CE parameters, which involves additional overhead signaling. Accordingly, in other examples, postponing of A-SRS may accomplished with only RRC configurations, where a UE is configured thereby to follow particular processes or schemes for postponing A-SRS without the need for DCI signaling or MAC-CE parameters. As will be discussed herein, various RRC configurations may be utilized that establish how the UE is postpone A-SRS transmissions, how many times A-SRS transmissions can be postponed, as well as priority rules for A-SRS transmissions. Broadly, these various RRC configurations may be termed herein as "slot postponing configurations."

Concerning how to postpone the A-SRS transmissions in cases where conflicts arise or slot formats are changed from U to D or F, one slot postponing configuration may include configuring multiple slot offsets in RRC. Further, the configuration may include defining an predefined or default order of how the UE is to select a particular slot offset of the multiple slot offsets. In one example, the RRC slot postponing configuration may establish that a UE will use the smallest possible slot offset (e.g., the smallest number of slots for the slot offset) to transmit the A-SRS in response to the triggering DCI. In further aspects, if the resource with smallest slot offset is not available, the slot postponing configuration may include that the UE will try the second smallest one, and so on. In another aspect, it is noted an RRC list may be used for managing slot offsets, with each slot offset having an associated index. Accordingly, the UE may also be configured with a slot postponing configuration where the slot offset with smallest possible index in the RRC list is first utilized to transmit the A-SRS. Further, if the resource available with the index is not available, the UE may be configured to select a next highest index, and so on.

According to another example, RRC may configured a slot postponing configuration that includes a single slot offset, and, in addition to the single slot offset (a first slot offset), an extra slot offset (a second slot offset) may be configured. In this case, the extra slot offset may be counted in terms of UL slots only (e.g., in terms of U slots only where interim D and F slots are not counted) or in terms of all slots (e.g., all U, D, and F slots that may be assigned/scheduled are used in counting the slot offset value). In yet another example, the slot postponing configuration may be configured such that the extra slot offset overwrites the slot offset (e.g., assuming that a UE can only use one slot offset in a list, if the first slot offset can be overwritten, then only the first slot offset or the overwritten slot offset (i.e., one of the slot offsets) can be used). According to still another example, the extra slot offset can be configured in RRC such the UE only uses this extra slot offset for postponed A-SRS. In yet another aspect, the extra slot offset may be configured for use by UE for the first A-SRS transmission, which may also be together with the configured one slot offset (i.e., the first slot offset).

In yet another example, the slot postponing configuration may include that one slot offset is configured by RRC, and no extra slot offset is configured. In this case, the UE may be configured to postpone the SRS to the next occurring UL slot, rather than at the UL slot after the extra slot offset. According to still another example, a fixed value may be always configured, such that there is no need to have an additional parameter in RRC included.

According to yet another aspect, the slot postponing configuration may include the utilization of different slot offset definitions. That is, regardless of how the slot offset is configured, the definition of the slot offset can be different for different scenarios. For example, for a same configured slot offset value, the actual slot offsets that are obtained or used by the UE will be different for different scenarios. In particular, the slot offset value may be defined differently dependent upon different numerologies, different SRS usages, such as whether SRS is used for positioning, or whether partial or full SRS symbols are not available.

In addition to defining how the slot offset is configured as discussed above, the slot postponing configuration may also specify how many times an A-SRS transmission may be postponed to avoid prolonged repetition of A-SRS postponement, for example. In one example, the RRC may configure a UE with a parameter or setting of how many times the SRS can be postponed. In one aspect, this may be implemented without an additional RRC parameter (i.e., without any new parameters added to typical RRC configuration parameters), wherein the UE is configured to postpone A-SRS transmission an m number of times, where m equals the number of available SRS slot offsets configured in RRC. In an alternative, again no additional RRC parameter may be utilized wherein the UE is configured to be able to postpone A-SRS transmission an m number of times, where m is a predefined fixed number set by the RRC configuration of the UE. In yet another aspect, a new RRC parameter may be added, wherein the parameter is used indicate how many times A-SRS transmissions can be postponed. In this case, the parameter may be some value n of maximum postponements that is provided to the UE that explicitly defines the number (e.g., n=1, n=2, n=3, etc.).

When A-SRS is postponed, in another aspect the slot postponing configuration may include that the configured slot offset or extra slot offsets can be automatically updated or determined based on the number of allowed postponing times. For example, if a slot offset k is configured and an extra slot offset (e.g., a value Δ) is configured as was discussed earlier, the UE may be configured to postpone the A-SRS transmission to a slot with the slot offset of k+Δ. Further, further slot offsets equal to the sum of the original offset and integer multiples of the value may be used to determine these further slot offsets up to an m maximum number of postponements (e.g., k+2Δ, k+3Δ, . . . , k+mΔ).

Figure 11:
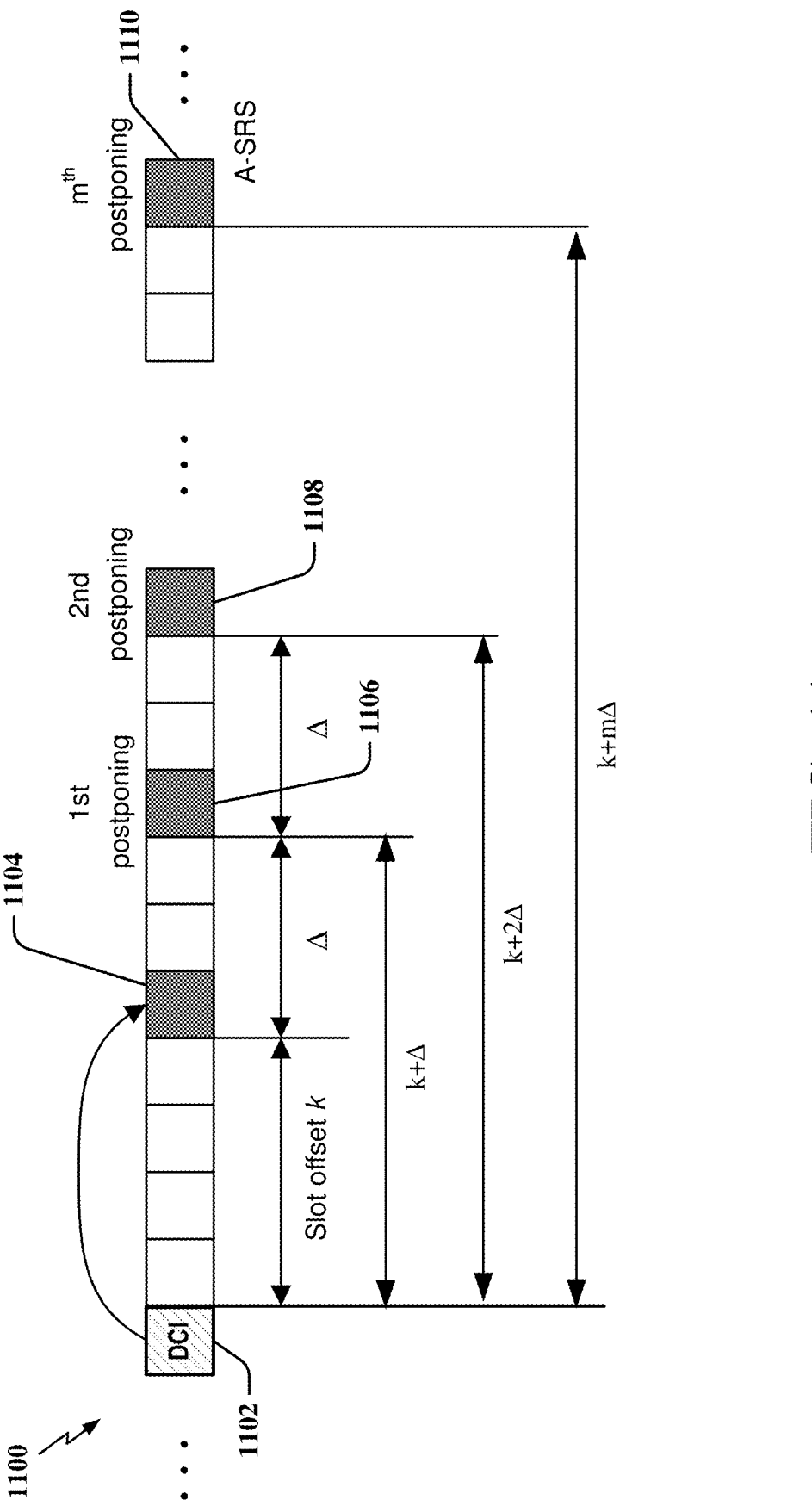
FIG. 11 illustrates an example of a transmission timeline showing various postponement times according to some aspects.

As an illustration of the determination above, FIG. 11 shows a timeline 1100 of slots. When a triggering DCI 1102 is received, the A-SRS transmission will be scheduled by the UE at a slot after slot offset k as shown at slot 1104. If there is a conflict or some other reason that the A-SRS may not be transmitted at slot 1104, a first postponement slot offset value Δ is applied (e.g., k+Δ) such that the A-SRS is then scheduled for transmission slot 1106. If A-SRS transmission is not possible after this offset at slot 1106, a next postponement is effected after another offset value Δ is applied (e.g., k+2Δ) to slot 1108. Again, if A-SRS transmission is not possible, further postponements may be effectuated up to the maximum m number of times, which is shown at slot 1110 after the application of a slot offset k+mΔ, where an A-SRS transmission is sent as shown by the designation "A-SRS" by slot 1110.

Figure 12:
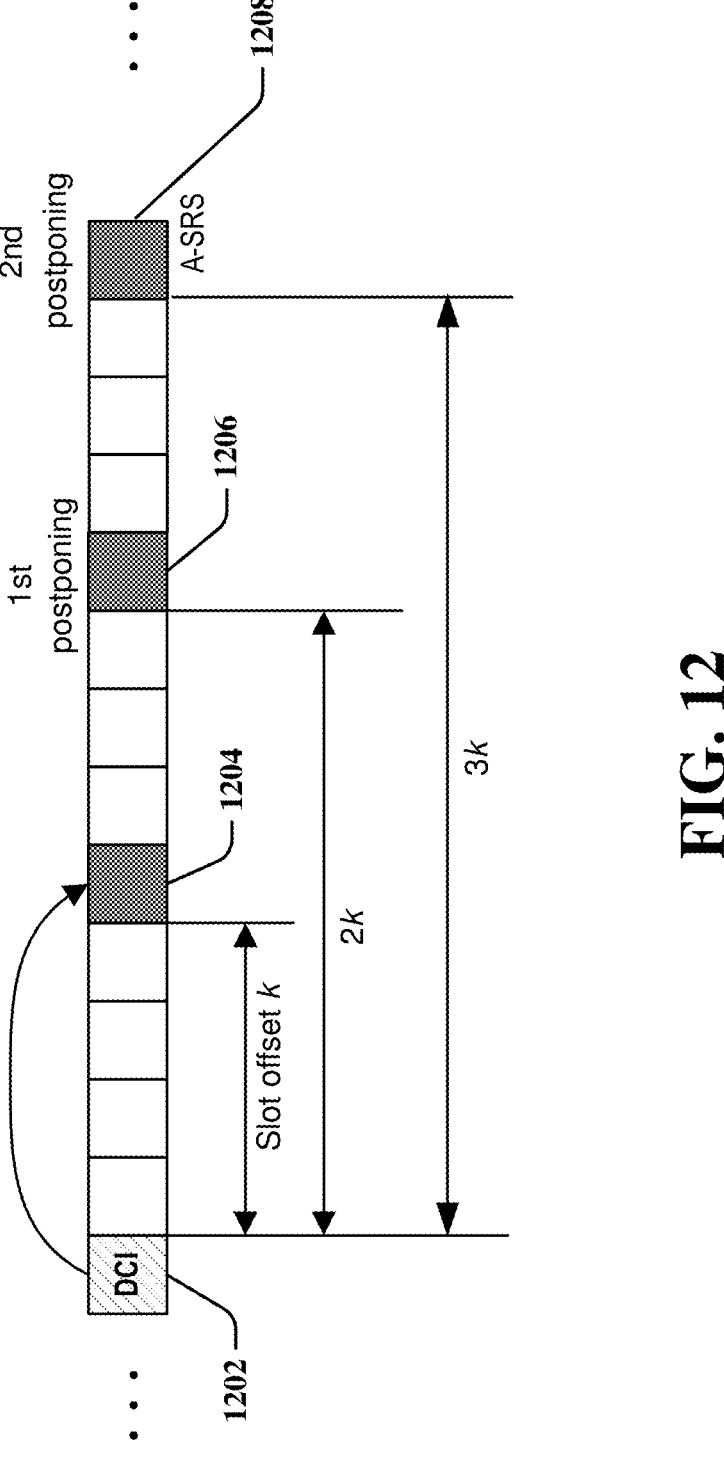
FIG. 12 illustrates another example of a transmission timeline showing various postponement times according to some aspects.

In other aspects, the slot postponing configuration may be configured to postpone A-SRS transmission over integer multiples of the slot offset k (e.g., either a slot offset or a slot offset together with extra slot offset) when so configured. In this case, a UE may be configured to postpone the SRS to the slot with slot offset k, then an integer multiple 2k, up to an (m+1)k slot offset. As an illustration, FIG. 12 shows an example transmission timeline of slots, where a triggering DCI 1202 is transmitted and received by a UE. The first slot offset k is shown at slot 1204. Assuming A-SRS transmission is not possible at this slot 1204, a first postponement is determined based on an integer multiple of the slot offset k, such as 2k which yields slot 1206 for the first postponing (although not limited to such as the offset might be made at 4k, 8k, etc. or 3k, 5k, 7k, etc., rather than at sequential integer multiples). If A-SRS cannot be transmitted at slot 1206, a second postponing is illustrated after a 3k slot offset that yields slot 1208.

In cases of multiple A-SRS resource sets, a collision may occur between two A-SRS resource sets. Priority rules may be utilized to determine which resource set will be dropped and which set will be postponed. Thus, according to yet further aspects, it is noted that the slot postponing configuration may be configured with various priority rules for A-SRS transmission in light of the configured postponing capabilities.

In one example, each of the A-SRS resource sets may be assigned with priority levels. In an aspect, the A-SRS resource set having the highest priority level will be transmitted and an A-SRS resource set with less priority will be postponed with deference to the higher priority set. Concerning how to assign priority levels the A-SRS resource sets, various options may be utilized. In one option, higher (or highest) priority is assigned for the latest triggered A-SRS resource set; namely the most recently triggered. In another option, the oldest triggered A-SRS resource set could be set as the higher priority A-SRS resource set. In yet another option, the priority may be determined based on the SRS Resource set ID (See e.g., 608 in FIG. 6 as one example). Here, a predetermined priority may be assigned to the different ID. In still another option, priority may be based on the status of the resource set with respect to the number of postponements that the resource set has encountered. For example, if a resource set has reached the maximum number of postponements (i.e., the set will be dropped if one more postponement is encountered (i.e., the set does not have resource to transmit the A-SRS)), such resource sets may be assigned higher or highest priority. It is noted that two A-SRS collisions may be considered as an error case in known 3GPP specification. However, by introducing the above-described priority rules for A-SRS, a gNB can configure the SRS to be more flexible (e.g., overwrite a previous triggering).

Figure 13:
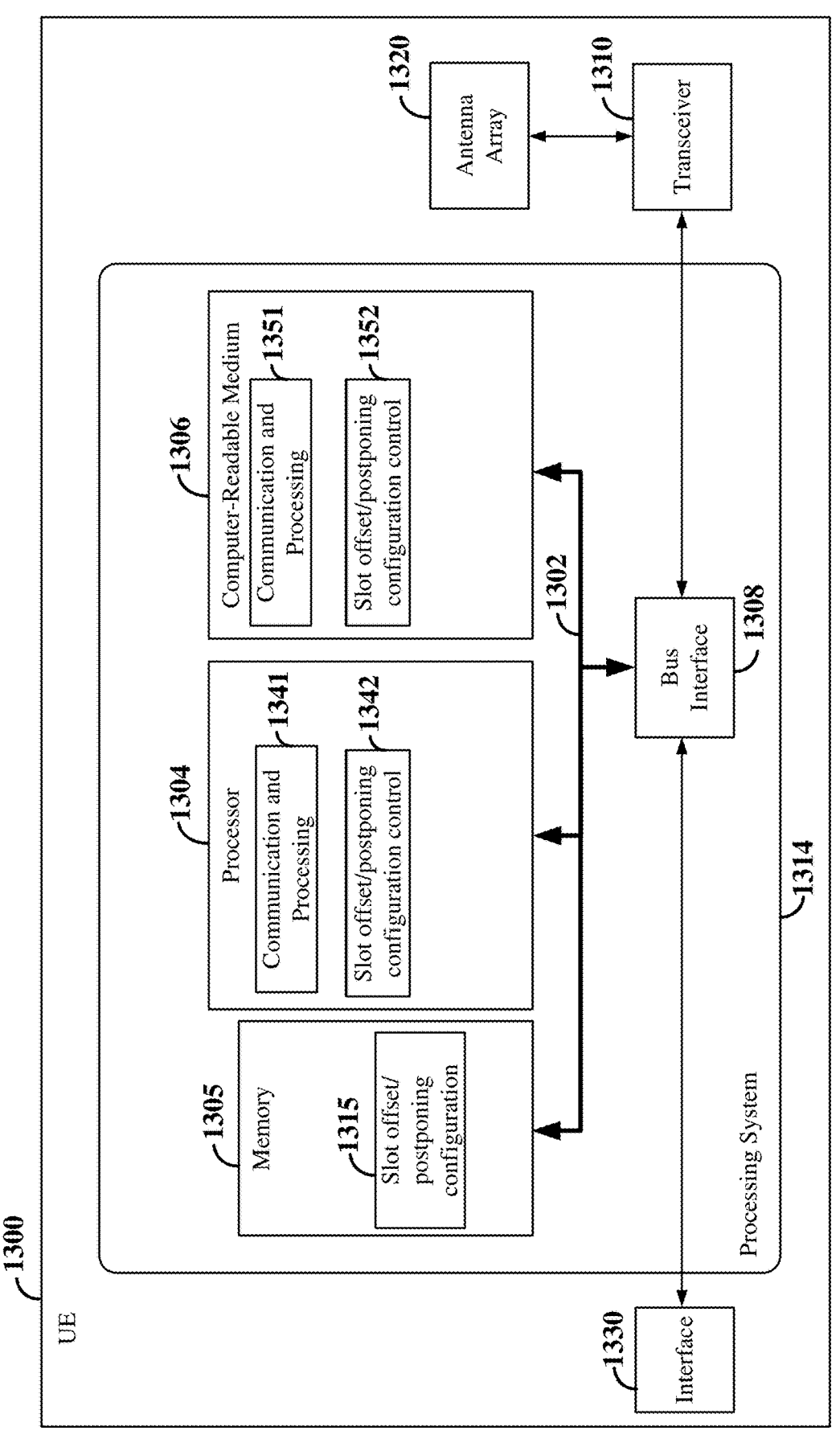
FIG. 13 is a block diagram illustrating an example of a hardware implementation for a user equipment (UE) employing a processing system according to some aspects.

FIG. 13 is a block diagram conceptually illustrating an example of a hardware implementation for a user equipment (UE) employing a processing system 1314 according to some aspects of the disclosure. In accordance with various aspects of the disclosure, an element, or any portion of an element, or any combination of elements may be implemented with a processing system 1314 that includes one or more processors 1304. In some implementations, the UE 1300 may correspond to any of the UEs or schedule entities shown in any of FIGS. 1 and 2.

The UE 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described below.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and between the bus 1302 and an interface 1330. The transceiver 1310 provides a communication interface or means for communicating with various other apparatus over a wireless transmission medium. In some examples, the wireless communication device may include two or more transceivers 1310, each configured to communicate with a respective network type (e.g., terrestrial or non-terrestrial). At least one interface 1330 (e.g., a network interface and/or a user interface) provides a communication interface or means of communicating with various other apparatus and devices (e.g., other devices housed within the same apparatus as the UE 1300 or an external apparatus) over an internal bus or via external transmission medium, such as an Ethernet cable.

The processor 1304 is responsible for managing the bus 1202 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1300 may be configured to perform any one or more of the operations described herein (e.g., as described above in conjunction with FIGS. 1-12 and as described below in conjunction with FIG. 13). In some aspects of the disclosure, the processor 1304, as utilized in the UE 1300, may include circuitry configured for various functions.

The processor 1304 may be configured to generate, schedule, and modify a resource assignment or grant of time-frequency resources (e.g., a set of one or more resource elements). For example, the processor 1304 may schedule time-frequency resources within a plurality of time division duplex (TDD) and/or frequency division duplex (FDD) subframes, slots, and/or mini-slots to carry user data traffic and/or control information to and/or from multiple UEs.

The processor 1304 may be configured to schedule resources for the receipt of downlink reference signals (e.g., SSBs, DCI, or CSI-RSs) on a plurality of downlink beams for a downlink beam sweep in accordance with a selected downlink beam sweep type and selected number of downlink reference signal resources indicated in a request for uplink beam refinement received from a UE. The processor 1304 may further be configured to schedule and transmit resources for the uplink transmission of uplink reference signals (e.g., SRSs or A-SRSs in response to a trigger DCI and slot offset configurations as disclosed herein) on a plurality of uplink beams for an uplink beam sweep in accordance with a selected beam sweep type and selected number of uplink reference signal resources indicated in the request. The processor 1304 may further be configured to schedule resources that may be utilized by the UE to transmit the request. For example, the uplink beam refinement request resources may include resources scheduled for transmission of a PUCCH, PUSCH, PRACH occasion, or RRC message. In some examples, the processor 1304 may be configured to schedule PUSCH resources for the uplink beam refinement request in response to transmitting a scheduling request to a network node such as a gNB or base station.

The processor 1304 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

The processor 1304 may include communication and processing circuitry 1341. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains. The communication and processing circuitry 1341 may further be configured to execute communication and processing software 1351 included on the computer-readable medium 1306 to implement one or more functions described herein.

In some examples, the communication and processing circuitry 1341 may be configured to receive downlink beamformed signals at a mmWave frequency or a sub-6 GHz frequency via the transceiver 1310 and the antenna array 1320. For example, the communication and processing circuitry 1341 may be configured to receive PDCCH signals, including the triggering DCI for A-SRS transmissions via at least one first antenna panel of the antenna array 1320 and transceiver 1310.

The communication and processing circuitry 1341 may further be configured to receive RRC signaling at upper layers. In one aspect, the communication and processing circuitry 1341 may receive and process the RRC layer signaling for implementing the slot postponing configuration described above in connection with FIGS. 1-11. In particular, the slot postponing configuration may be stored in memory 1305 as represented by slot postponing configuration 1315. It is noted here that at least a portion of the configuration 1315 may be pre-stored or predefined and not derived from RRC signaling according to some aspects.

The communication and processing circuitry 1341 may further be configured to send an uplink signal on one or more uplink receive beams via one or more uplink transmit beams applied to the uplink signal. For example, the communication and processing circuitry 1341 may be configured to send the uplink signal on one or more uplink receive beams via at least one second antenna panel of the antenna array 1320. The uplink signal may include, for example, a PUCCH, PUSCH, SRS (including A-SRS), DMRS, or PRACH. In a particular aspect, the communication and processing circuitry 1341 is configured to transmit A-SRS with a slot offset. In cases of not being able to transmit A-SRS at the first slot offset, the communication and processing circuitry 1341 is configured to transmit A-SRS based on the slot postponing configuration 1315 stored in memory 1305 and in conjunction with a slot postponing control circuitry 1342, to be discussed below.

The processor 1304 also includes the slot offset/postponing control circuitry 1342 configured to perform slot postponing control-related operations as discussed herein including offset determinations used as part of the slot postponing control operations. The slot postponing control circuitry 1342 may include functionality for a means for determining the slot postponing including means for determining and selecting the slot offset configuration (e.g., multiple slot offsets, single slot offset+extra slot offset), means for determining an order for selecting the slot offsets, means for determining a number of times an A-SRS may be postponed, means for defining the slot offsets based on conditions, and means for determining and implementing priority rules. The slot postponing control circuitry 1342 may further be configured to execute slot offset/postponing control software 1352 included on the computer-readable medium 1306 to implement one or more functions described herein.

Figure 14:
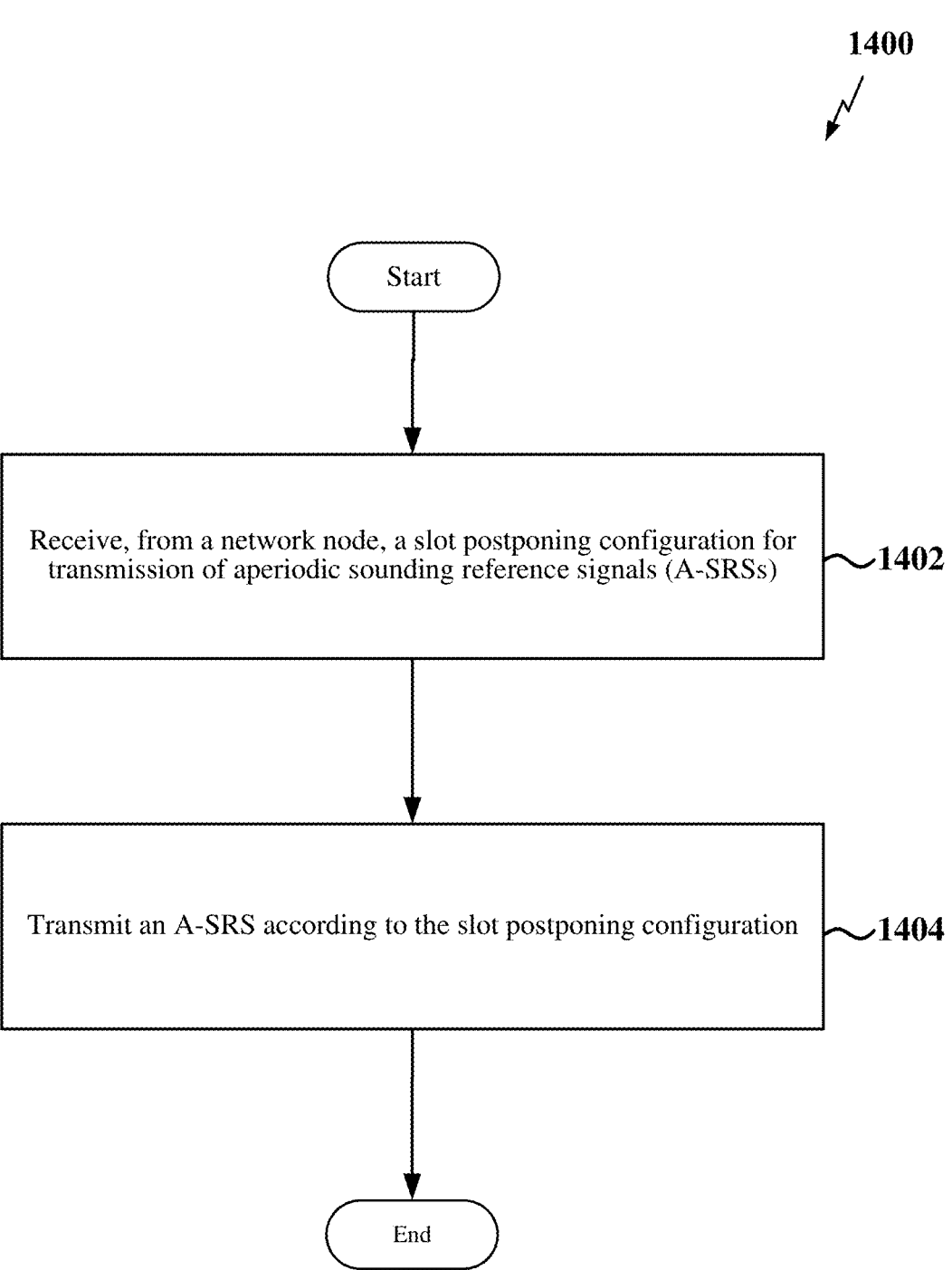
FIG. 14 is a flow chart illustrating an example of a method for communication in a UE according to some aspects.

FIG. 14 is a flow chart illustrating an example wireless communication method 1400 according to some aspects of the disclosure. As described herein, some or all illustrated features may be omitted in a particular implementation within the scope of the present disclosure, and some illustrated features may not be required for implementation of all embodiments. In some examples, the method 1400 may be carried out by the UE 1300 illustrated in FIG. 13. In some examples, the method 1400 may be carried out by any suitable apparatus or means for carrying out the functions or algorithm described below.

At block 1402, the UE may receive, from a network node (e.g., gNB or base station), at least a portion of a slot postponing configuration for transmission of aperiodic sounding reference signals (A-SRSs). While all of the slot postponing configuration could be configured by RRC (i.e., via the network) in the processes of block 1402, it is noted the method 1400 may also include that at least a portion of the slot postponing configuration includes fixed parameters that are predefined or prestored in the UE and are not received or derived from the network node. These parameters may be stored as configuration information 1315 in memory 1305, in one example.

At block 1404, the UE may transmit the A-SRS to a network node according to the slot postponing configuration. It is noted that at block 1404, the UE may receive and act upon triggering DCI from the network node 1404. Also of note, while triggering is typical for A-SRS transmission, it is recognized that other triggers apart from DCI (or even apart from a particular network node) may be developed or contemplated, and thus this is merely one option for triggering. In other aspects, it is contemplated that the triggering may be received from another UE device acting as scheduling entity (or network node) and configured to be able to utilize SRS information.

In some examples, the slot postponing configuration of method 1400 comprises a configured plurality of slot offsets for A-SRS transmission, wherein each slot offset of the plurality of slot offsets corresponds to a respective time offset for transmission of the A-SRS transmission. Furthermore, the plurality of slot offsets may be configured in a predefined order wherein a UE selects from the plurality of slot offsets according to the predefined order. Additionally, the predefined order may include placing a slot offset with the least amount of time offset as a first slot offset of the plurality in the predefined order. In yet another example, the predefined order further includes ordering the slot offset in an order of increasing slot offset times of the plurality of slot offsets starting from the first slot offset. Yet further, method 1400 may include ordering the plurality of slot offset in a list with RRC signaling, wherein each slot offset is assigned a respective index in the list. Additionally, method 1400 may include selecting a slot offset with a smallest index in the list for transmitting the A-SRS. It is noted that these processes may be implemented by the slot postponing configuration control circuitry 1342 in FIG. 13, as one example, or equivalent suitable means for implementing these processes.

In some other examples, the slot postponing configuration in method 1400 may include a first slot offset for A-SRS transmission and at least a second slot offset for A-SRS transmission. Additionally, method 1400 may include configuring the UE to count the first slot offset or the second slot offset based on one of counting uplink (UL) slots or counting all available slots. Still further, method 1400 may include that the UE is configured to overwrite the first slot offset with the second slot offset. In another example, the second slot offset may be configured for use in A-SRS transmission when transmit resources are not available for use of the first slot offset. In yet another example, the second slot offset may be configured for use in a first transmission of the A-SRS transmission with A-SRS transmission with the first slot offset.

In another example, method 1400 may include that the slot postponing configuration includes configuring the UE to transmit the A-SRS transmission after the postponement of transmission of the A-SRS transmission past a first available slot for A-SRS transmission such that a second available slot is utilized by the UE for A-SRS transmission. Additionally, in another aspect, a portion of the slot postponing configuration may be configured as a predefined fixed configuration in the UE to use of the second available slot for A-SRS transmission that is dependent of the slot postponing configuration received from the network node.

In yet further examples, method 1400 may include that the slot postponing configuration further comprises a plurality of slot postponing configurations wherein each of the plurality of slot postponing configurations may utilize a respective slot offset configuration based on one or more of transmission numerology, SRS usage, when the SRS is used for positioning, when partial SRS symbols are available, or when all SRS symbols are not available. The slot postponing configuration may further include a parameter indicating a maximum number of slot offsets that transmission of the A-SRS may be postponed. Additionally, the parameter may be configured by RRC signaling from the network node. In another example, the maximum number of slot offsets may be a fixed number of slot offsets. Additionally, the parameter may be an RRC parameter configured by the network node to variably set the maximum number of slot offsets that the transmission of the A-SRS may be postponed.

In some other examples, method 1400 may include that the slot postponing configuration includes a parameter indicating a first slot offset of a plurality of slot offsets for transmission of the A-SRS and a spacing number of slots (e.g., the A shown in FIG. 11) between additional slot offsets of the plurality of slot offsets that may be used for transmission of the A-SRS. Additionally, method 1400 may include that the spacing between the first slot offset and a next additional slot offset of the plurality of slot offsets is determined based on sum of first slot offset and the spacing number of slots. Moreover, the spacing number of slots may be a multiplier number (See e.g., the k multiples in FIG. 12) and spacing between the first slot offset and a next additional slot offset of the plurality of slot offsets may be determined based on a product of the first slot offset and the spacing number of slots.

In further examples, method 1400 may include that the slot postponing configuration further includes transmitting a first A-SRS resource set having a first priority and postponing a second A-SRS resource set having a second priority less than the first priority. Additionally, the method 1400 may include that the first priority is assigned to the A-SRS resource set that is the most recently triggered A-SRS. In other examples, the first priority is assigned to the A-SRS resource set that is the A-SRS resource set pending that was triggered the longest time. In yet further examples, the first priority is assigned based on an A-SRS resource set identifier. In still further examples, an A-SRS resource set that has been postponed a maximum number of times for postponement is assigned a higher priority over A-SRS resource sets that have not been postponed the maximum number of times.

Figure 15:
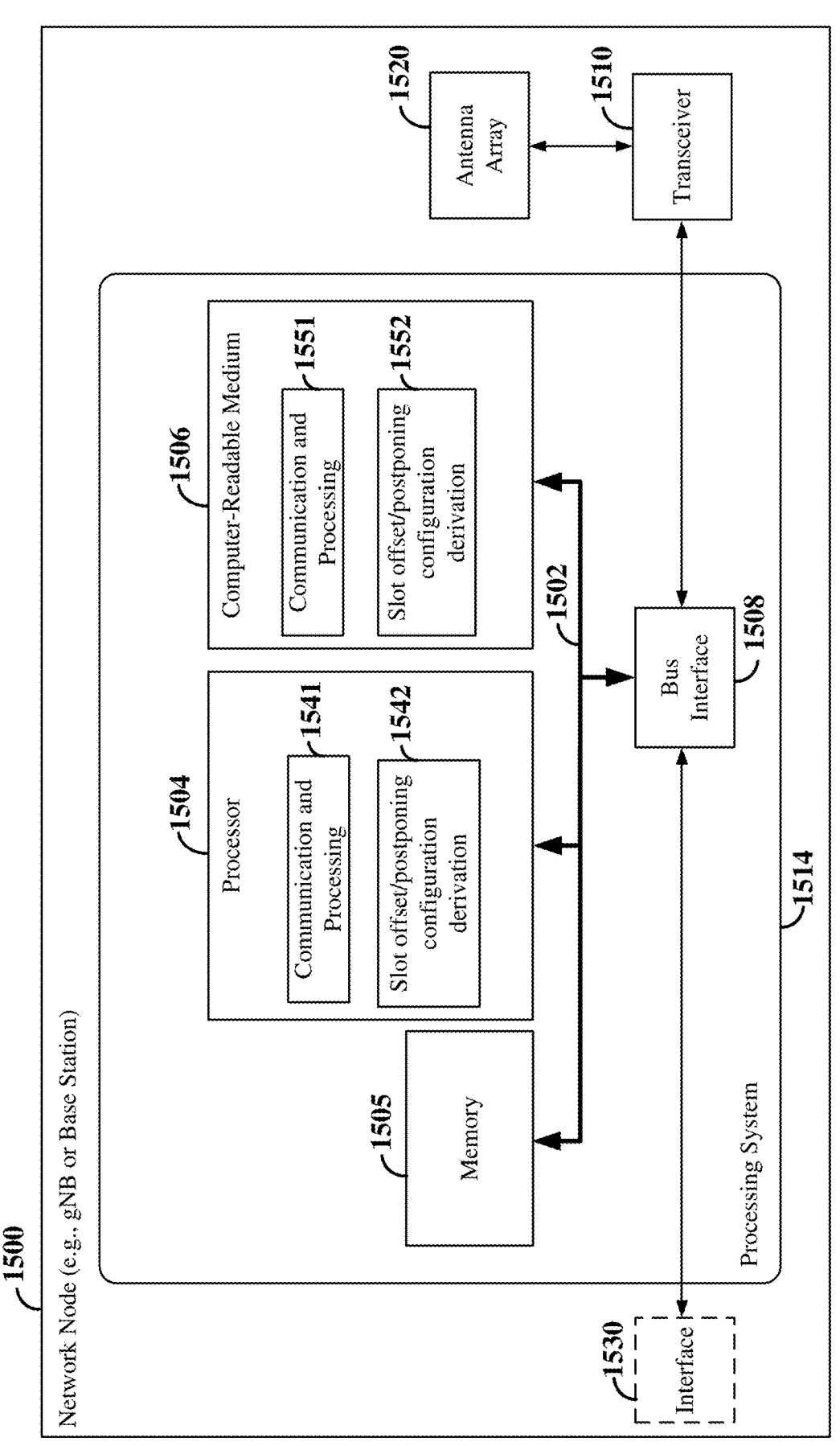
FIG. 15 is a block diagram illustrating an example of a hardware implementation for network node employing a processing system according to some aspects.

FIG. 15 is a block diagram conceptually illustrating an example of a hardware implementation for a network node 1500 employing a processing system 1514 according to some aspects of the disclosure. In accordance with various aspects of the disclosure, an element, or any portion of an element, or any combination of elements may be implemented with a processing system 1514 that includes one or more processors 1504. In some implementations, the network node 1500 may correspond to any of the B Ss (e.g., gNBs, eNBs, etc.) or scheduling entities shown in any of FIGS. 1 and 2.

The network node 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network node 1500 may be configured to perform any one or more of the functions described herein. That is, the processor 1504, as utilized in a network node 1500, may be used to implement any one or more of the processes and procedures described herein.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510 and between the bus 1502 and an interface 1530. The transceiver 1510 provides a communication interface or means for communicating with various other apparatus over a wireless transmission medium. In some examples, the wireless communication device may include two or more transceivers 1510, each configured to communicate with a respective network type (e.g., terrestrial or non-terrestrial). At least one interface 1530 (e.g., a network interface and/or a user interface) provides a communication interface or means of communicating with various other apparatus and devices (e.g., other devices housed within the same apparatus as the network node 1500 or an external apparatus) over an internal bus or external transmission medium, such as an Ethernet cable.

The processor 1504 is responsible for managing the bus 1502 and general processing, including the execution of software stored on the computer-readable medium 1506. The software, when executed by the processor 1504, causes the processing system 1514 to perform the various functions described below for any particular apparatus. The computer-readable medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1506.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1500 may be configured to perform any one or more of the operations described herein (e.g., as described above in conjunction with FIGS. 1-12 and as described below in conjunction with FIG. 16). In some aspects of the disclosure, the processor 1504, as utilized in the network node 1500, may include circuitry configured for various functions.

The processor 1504 may be configured to generate, schedule, and modify a resource assignment or grant of time-frequency resources (e.g., a set of one or more resource elements). For example, the processor 1504 may schedule time-frequency resources within a plurality of time division duplex (TDD) and/or frequency division duplex (FDD) subframes, slots, and/or mini-slots to carry user data traffic and/or control information to and/or from multiple UEs.

The processor 1504 may be configured to schedule resources for the transmission of downlink reference signals (e.g., SSBs or CSI-RSs) or DCI (or SRS triggering) on a plurality of downlink beams for a downlink beam sweep in accordance with a selected downlink beam sweep type and selected number of downlink reference signal resources indicated in a request for uplink beam refinement received from a UE. The processor 1504 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1504 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 1504 may be configured to schedule PUSCH resources for the uplink beam refinement request in response to receiving a scheduling request from the UE.

The processor 1504 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

The processor 1504 may include communication and processing circuitry 1541. The communication and processing circuitry 1541 may include one or more hardware components that provide the physical structure that performs various processes related to wireless communication (e.g., signal reception and/or signal transmission) as described herein. The communication and processing circuitry 1541 may further include one or more hardware components that provide the physical structure that performs various processes related to signal processing (e.g., processing a received signal and/or processing a signal for transmission) as described herein. In some examples, the communication and processing circuitry 1541 may include two or more transmit/receive chains. The communication and processing circuitry 1541 may further be configured to execute communication and processing software 1551 included on the computer-readable medium 1506 to implement one or more functions described herein.

In some examples, the communication and processing circuitry 1541 may be configured to trigger A-SRS in a UE via transceiver 1510 and antenna array 1520, such as through DCI in the PDCCH. Additionally, the communication and processing circuitry 1541 may be configured to receive and process the uplink A-SRS signals receiving from the UE.

The processor 1504 may include slot offset/postponing configuration derivation circuitry 1542 configured to perform determine or derive the slot offset and slot postponing configurations that are sent to the UE. This circuitry 1542 may be configured to operate at the RRC level, at least in part, and to determine various parameters that are configured via RRC for configuring the UE in accordance with the various processes disclosed herein in connection with FIGS. 1-12 and 14. The slot offset/postponing configuration derivation circuitry 1542 may further be configured to execute slot offset/postponing configuration derivation software 1552 included on the computer-readable medium 1506 to implement one or more functions described herein.

Figure 16:
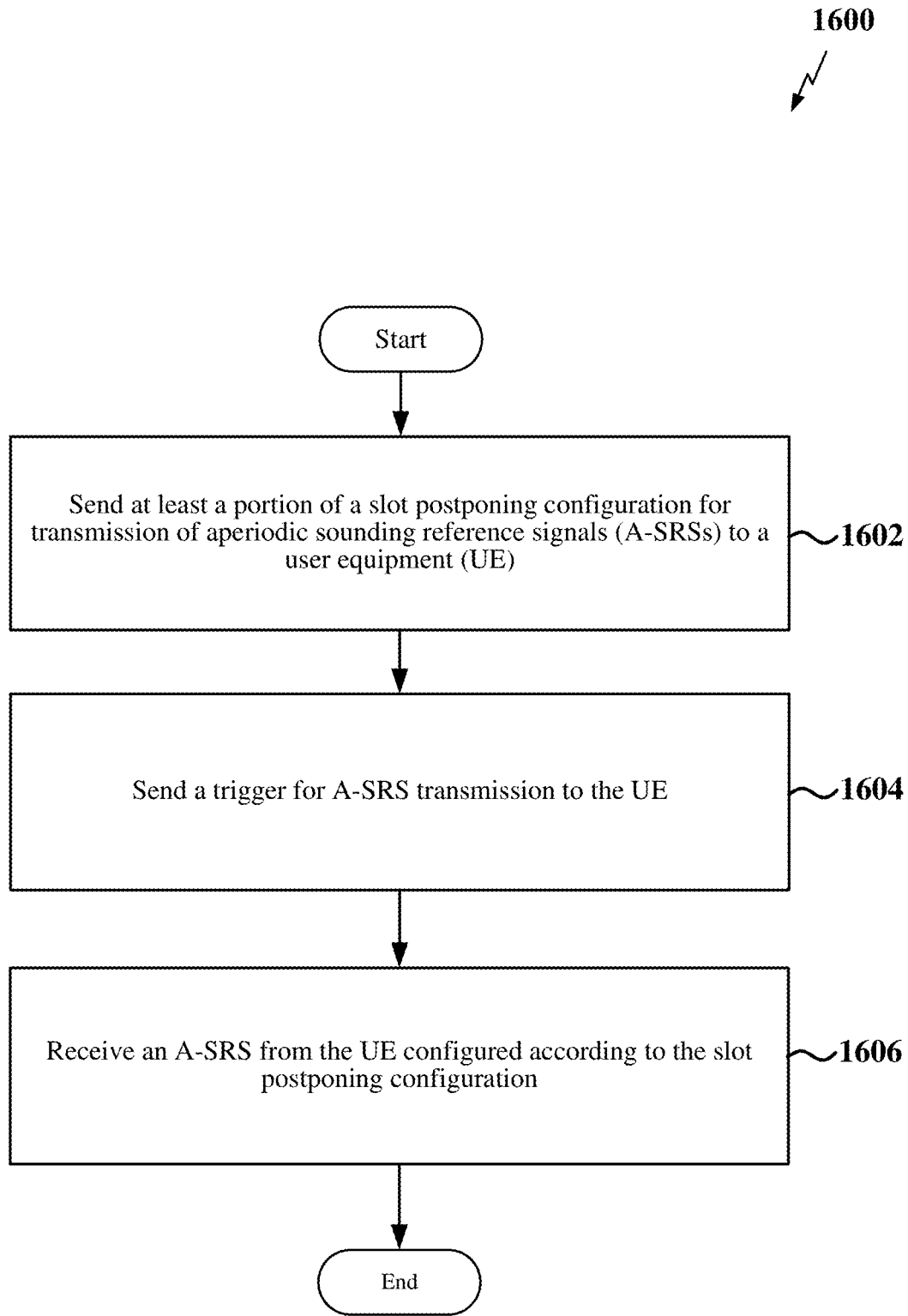
FIG. 16 is a flow chart illustrating a method for configuring a UE for slot postponing with a network node according to some aspects.

FIG. 16 is a flow chart illustrating an example wireless communication method 1600 according to some aspects of the disclosure. As described herein, some or all illustrated features may be omitted in a particular implementation within the scope of the present disclosure, and some illustrated features may not be required for implementation of all embodiments. In some examples, the method 1600 may be carried out by the network node 1500 (e.g., a gNB or base station) illustrated in FIG. 15. In some examples, the method 1600 may be carried out by any suitable apparatus or means for carrying out the functions or algorithm described below.

At block 1602, the method 1600 includes sending at least a portion of a slot postponing configuration for transmission of aperiodic sounding reference signals (A-SRSs) to a user equipment (UE). with the network node. This configuration may include any of the various configurations and methodologies discussed above with respect to FIGS. 1-11 and 13. Further, the process of block 1602 may include establishing the slot postponing configuration through RRC signaling without the utilization of downlink control information (DCI) or MAC-CE parameters for establishing the slot postponing configuration. The slot positioning configuration, as discussed above, may be used to control slot offset postponing, the number of slot offsets, the number of times transmission of A-SRS can be postponed in the UE, and priority rules based on the postponing configuration.

Additionally, method 1600 may include sending a trigger for A-SRS transmission the UE, such as DCI on the PDCCH as indicated at block 1604. Additionally, method 1600 may include receiving an A-SRS from the UE configured according to the slot postponing configuration as shown in block 1606. It is noted that the processes of blocks 1604 and 1606 are not necessary for the configuration processes 1602, and one example of method 1600 may include only the processes of block 1602.

Of further note, the present disclosure may include the following further examples.

In an example 1, a method, apparatus, and non-transitory computer-readable medium may provide wireless communication at a user equipment (UE) operable in a wireless communication network, including receiving, from a network node, at least a portion of a slot postponing configuration for transmission of aperiodic sounding reference signals (A-SRSs), and transmitting an A-SRS according to the slot postponing configuration.

In an example 2, the method, apparatus, and non-transitory computer-readable medium of example 1 may further include that the transmitting of the A-SRS is triggered by downlink control information (DCI) received from the network node.

In an example 3, the method, apparatus, and non-transitory computer-readable medium of examples 1 and 2 may further include the slot postponing configuration being configured in the UE via radio resource control (RRC) signaling from the network node.

In an example 4, the method, apparatus, and non-transitory computer-readable medium of examples 1 to 3 may further include the slot postponing configuration including a configured plurality of slot offsets for A-SRS transmission, wherein each slot offset of the plurality of slot offsets corresponds to a respective time offset for transmission of the A-SRS transmission.

In an example 5, the method, apparatus, and non-transitory computer-readable medium of examples 1 to 4 may further include the slot postponing configuration including the plurality of slot offsets configured in a predefined order wherein a UE selects from the plurality of slot offsets according to the predefined order.

In an example 6, the method, apparatus, and non-transitory computer-readable medium of examples 1 to 5 where the slot postponing configuration may further include the predefined order including placing a slot offset with the least amount of time offset as a first slot offset of the plurality in the predefined order.

In an example 7, the method, apparatus, and non-transitory computer-readable medium of examples 1 to 6 may further include the slot postponing configuration including a predefined order further including ordering the slot offset in an order of increasing slot offset times of the plurality of slot offsets starting from the first slot offset.

In an example 8, the method, apparatus, and non-transitory computer-readable medium of examples 1 to 5 may further include the slot postponing configuration including ordering the plurality of slot offsets in a list with RRC signaling, wherein each slot offset is assigned a respective index in the list.

In an example 9, the method, apparatus, and non-transitory computer-readable medium of examples 1 to 4 and 8 may further include the slot postponing configuration including selecting a slot offset with a smallest index in the list for transmitting the A-SRS.

In an example 10, the method, apparatus, and non-transitory computer-readable medium of examples 1 to 9 may further include the slot postponing configuration including the slot postponing configuration comprising a first slot offset for A-SRS transmission and at least a second slot offset for A-SRS transmission.

In an example 11, the method, apparatus, and non-transitory computer-readable medium of examples 1 to 10 may further include configuring the UE to count the first slot offset or the second slot offset based on one of counting uplink (UL) slots or counting all available slots.

In an example 12, the method, apparatus, and non-transitory computer-readable medium of examples 1 to 11 may further include the UE configured to overwrite the first slot offset with the second slot offset.

In an example 13, the method, apparatus, and non-transitory computer-readable medium of examples 1 to 10 may further include a second slot offset configured for use in A-SRS transmission when transmit resources are not available for use of a first slot offset.

In an example 14, the method, apparatus, and non-transitory computer-readable medium of examples 1 to 10 may further include a second slot offset configured for use in a first transmission of the A-SRS transmission with A-SRS transmission with the first slot offset.

In an example 15, the method, apparatus, and non-transitory computer-readable medium of examples 1 to 14 may further include the slot postponing configuration comprising configuring the UE to transmit the A-SRS transmission after the postponement of transmission of the A-SRS transmission past a first available slot for A-SRS transmission such that a second available slot is utilized by the UE for A-SRS transmission.

In an example 16, the method, apparatus, and non-transitory computer-readable medium of examples 1 to 15 may further include a portion of the slot postponing configuration is configured as a predefined fixed configuration in the UE to use of the second available slot for A-SRS transmission that is dependent of the slot postponing configuration received from the network node.

In an example 17, the method, apparatus, and non-transitory computer-readable medium of examples 1 to 16 may further include the slot postponing configuration further comprising a plurality of slot postponing configurations wherein each of the plurality of slot postponing configurations may utilize a respective slot offset configuration based on one or more of transmission numerology, SRS usage, when the SRS is used for positioning, when partial SRS symbols are available, or when all SRS symbols are not available.

In an example 18, the method, apparatus, and non-transitory computer-readable medium of examples 1 to 17 may further include the slot postponing configuration including a parameter indicating a maximum number of slot offsets that transmission of the A-SRS may be postponed.

In an example 19, the method, apparatus, and non-transitory computer-readable medium of examples 1 to 18 may further include a parameter configured by RRC signaling from the network node.

In an example 20, the method, apparatus, and non-transitory computer-readable medium of examples 1 to 19 may further include a maximum number of slot offsets is a fixed number of slot offsets.

In an example 21, the method, apparatus, and non-transitory computer-readable medium of examples 1 to 20 may further include a parameter that is an RRC parameter configured by the network node that variably sets the maximum number of slot offsets that the transmission of the A-SRS may be postponed.

In an example 22, the method, apparatus, and non-transitory computer-readable medium of examples 1 to 21 may further include that the slot postponing configuration includes a parameter indicating a first slot offset of a plurality of slot offsets for transmission of the A-SRS and a spacing number of slots between additional slot offsets of the plurality of slot offsets that may be used for transmission of the A-SRS.

In an example 23, the method, apparatus, and non-transitory computer-readable medium of examples 1 to 21 may further include that spacing between the first slot offset and a next additional slot offset of the plurality of slot offsets may be determined based on sum of first slot offset and the spacing number of slots.

In an example 24, the method, apparatus, and non-transitory computer-readable medium of examples 1 to 23 may further include wherein the spacing number of slots comprises a multiplier number, and spacing between the first slot offset and a next additional slot offset of the plurality of slot offsets may be determined based on a product of the first slot offset and the spacing number of slots.

In an example 25, the method, apparatus, and non-transitory computer-readable medium of examples 1 to 224 may further include transmitting a first A-SRS resource set having a first priority and postponing a second A-SRS resource set having a second priority less than the first priority.

In an example 26, the method, apparatus, and non-transitory computer-readable medium of examples 1 to 25 may further include a first priority is assigned to the A-SRS resource set that is the most recently triggered A-SRS.

In an example 27, the method, apparatus, and non-transitory computer-readable medium of examples 1 to 25 may further include a first priority is assigned to the A-SRS resource set that is the A-SRS resource set pending that was triggered the longest time.

In an example 28, the method, apparatus, and non-transitory computer-readable medium of examples 1 to 27 may further include a first priority assigned based on an A-SRS resource set identifier.

In an example 29, the method, apparatus, and non-transitory computer-readable medium of examples 1 to 25 may further include an A-SRS resource set that has been postponed a maximum number of times for postponement is assigned a higher priority over A-SRS resource sets that have not been postponed the maximum number of times.

In an example 30, the method, apparatus, and non-transitory computer-readable medium of examples 1 to 29 may further include at least another portion of the slot postponing configuration further includes fixed parameters that are predefined in the UE and are not received or derived from the network node.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication at a user equipment (UE) operable in a wireless communication network, the method comprising:
   receiving, from a network node, at least a portion of a slot postponing configuration for transmission of aperiodic sounding reference signals (A-SRSs); and
   transmitting an A-SRS according to the slot postponing configuration.

2. The method of claim 1, wherein the transmitting of the A-SRS is triggered by downlink control information (DCI) received from the network node.

3. The method of claim 1, wherein the slot postponing configuration is configured in the UE via radio resource control (RRC) signaling from the network node.

4. The method of claim 1, wherein the slot postponing configuration comprises a configured plurality of slot offsets for A-SRS transmission, wherein each slot offset of the plurality of slot offsets corresponds to a respective time offset for transmission of the A-SRS transmission.

5. The method of claim 4, wherein plurality of slot offsets are configured in a predefined order wherein a UE selects from the plurality of slot offsets according to the predefined order.

6. The method of claim 5, wherein the predefined order includes placing a slot offset with the least amount of time offset as a first slot offset of the plurality in the predefined order.

7. The method of claim 5, further comprising:
   ordering the plurality of slot offsets in a list with RRC signaling, wherein each slot offset is assigned a respective index in the list.

8. The method of claim 7, further comprising:
   selecting a slot offset with a smallest index in the list for transmitting the A-SRS.

9. The method of claim 1, wherein the slot postponing configuration comprises a first slot offset for A-SRS transmission and at least a second slot offset for A-SRS transmission.

10. The method of claim 9, further comprising configuring the UE to count the first slot offset or the second slot offset based on one of counting uplink (UL) slots or counting all available slots.

11. The method of claim 9, further comprising:
   wherein the UE is configured to overwrite the first slot offset with the second slot offset.

12. The method of claim 9, wherein the second slot offset is configured for use in A-SRS transmission when transmit resources are not available for use of the first slot offset.

13. The method of claim 9, wherein the second slot offset is configured for use in a first transmission of the A-SRS transmission with A-SRS transmission with the first slot offset.

14. The method of claim 1, wherein the slot postponing configuration comprises configuring the UE to transmit the A-SRS transmission after the postponement of transmission of the A-SRS transmission past a first available slot for A-SRS transmission such that a second available slot is utilized by the UE for A-SRS transmission.

15. The method of claim 14, wherein a portion of the slot postponing configuration is configured as a predefined fixed configuration in the UE to use of the second available slot for A-SRS transmission that is dependent of the slot postponing configuration received from the network node.

16. The method of claim 1, wherein the slot postponing configuration further comprises a plurality of slot postponing configurations wherein each of the plurality of slot postponing configurations may utilize a respective slot offset configuration based on one or more of transmission numerology, SRS usage, when the SRS is used for positioning, when partial SRS symbols are available, or when all SRS symbols are not available.

17. The method of claim 1, further comprising:
   the slot postponing configuration includes a parameter indicating a maximum number of slot offsets that transmission of the A-SRS may be postponed.

18. The method of claim 1, further comprising:
   the slot postponing configuration includes a parameter indicating a first slot offset of a plurality of slot offsets for transmission of the A-SRS and a spacing number of slots between additional slot offsets of the plurality of slot offsets that may be used for transmission of the A-SRS.

19. The method of claim 18, further comprising:
   wherein the spacing between the first slot offset and a next additional slot offset of the plurality of slot offsets may be determined based on sum of first slot offset and the spacing number of slots.

20. The method of claim 18, further comprising:
   wherein the spacing number of slots comprises a multiplier number; and spacing between the first slot offset and a next additional slot offset of the plurality of slot offsets may be determined based on a product of the first slot offset and the spacing number of slots.

21. The method of claim 1, wherein the slot postponing configuration further comprises:

transmitting a first A-SRS resource set having a first priority and postponing a second A-SRS resource set having a second priority less than the first priority.

22. A UE for wireless communication, comprising:

a transceiver;

a memory; and a processor communicatively coupled to the transceiver and the memory, wherein the processor and the memory are configured to:

receive, from a network node, via the transceiver a slot postponing configuration for transmission of aperiodic sounding reference signals (A-SRSs); and transmit an A-SRS according to the slot postponing configuration.

23. A method of wireless communication at a network node operable in a wireless communication network, the method comprising:

sending at least a portion of a slot postponing configuration for transmission of aperiodic sounding reference signals (A-SRSs) to a user equipment (UE);

sending a trigger for A-SRS transmission to the UE; and receiving an A-SRS from the UE that is configured according to the slot postponing configuration.

24. The method of claim 23, wherein the trigger comprises downlink control information (DCI) transmitted on a physical downlink control channel (PDCCH).

25. The method of claim 23, wherein the slot postponing configuration is conveyed by the network node to the UE via radio resource control (RRC) signaling from the network node.

26. The method of claim 23, wherein the slot postponing configuration comprises a configured plurality of slot offsets for A-SRS transmission, wherein each slot offset of the plurality of slot offsets corresponds to a respective time offset for transmission of the A-SRS transmission.

27. The method of claim 26, wherein plurality of slot offsets are configured in a predefined order wherein a UE selects from the plurality of slot offsets according to the predefined order.

28. The method of claim 27, wherein the predefined order includes placing a slot offset with the least amount of time offset as a first slot offset of the plurality in the predefined order.

29. The method of claim 28, wherein the predefined order further includes ordering the slot offset in an order of increasing slot offset times of the plurality of slot offsets starting from the first slot offset.

30. A network node for wireless communication, comprising:

a transceiver;

a memory; and a processor communicatively coupled to the transceiver and the memory, wherein the processor and the memory are configured to:

send at least a portion of a slot postponing configuration for transmission of aperiodic sounding reference signals (A-SRSs) to a user equipment (UE);

send a trigger for A-SRS transmission to the UE; and receive an A-SRS from the UE that is configured according to the slot postponing configuration.

* * * * *